United States Patent
Ying et al.

(10) Patent No.: US 12,004,184 B2
(45) Date of Patent: Jun. 4, 2024

(54) USER EQUIPMENTS, BASE STATIONS AND METHODS FOR A CONFIGURABLE DOWNLINK CONTROL INFORMATION FORMAT

(71) Applicant: SHARP KABUSHIKI KAISHA, Sakai (JP)

(72) Inventors: Kai Ying, Vancouver, WA (US); Tatsushi Aiba, Sakai (JP); John Michael Kowalski, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 261 days.

(21) Appl. No.: 17/598,795

(22) PCT Filed: Mar. 19, 2020

(86) PCT No.: PCT/JP2020/012311
§ 371 (c)(1),
(2) Date: Sep. 27, 2021

(87) PCT Pub. No.: WO2020/196269
PCT Pub. Date: Oct. 1, 2020

(65) Prior Publication Data
US 2022/0191839 A1 Jun. 16, 2022

Related U.S. Application Data

(60) Provisional application No. 62/825,582, filed on Mar. 28, 2019.

(51) Int. Cl.
*H04W 4/00* (2018.01)
*H04L 1/1812* (2023.01)
(Continued)

(52) U.S. Cl.
CPC .......... *H04W 72/23* (2023.01); *H04L 1/1812* (2013.01); *H04W 72/56* (2023.01)

(58) Field of Classification Search
CPC ...... H04W 72/23; H04W 72/56; H04L 1/1812
(Continued)

(56) References Cited

U.S. PATENT DOCUMENTS 10,601,551 B2 * 3/2020 Ying ..................... H04L 1/08
11,109,368 B2 * 8/2021 Ying ..................... H04L 5/00
(Continued)

OTHER PUBLICATIONS

3GPP TS 38.331 V15.4.0 (Dec. 2018) 3rd Generation Partnership Project; Technical Specification Group Radio Access Network; NR; Radio Resource Control (RRC) protocol specification (Release 15).
(Continued)

*Primary Examiner* — Marceau Milord
(74) *Attorney, Agent, or Firm* — ScienBiziP, P.C.

(57) ABSTRACT

A user equipment (UE) is described. The UE includes a higher layer processor configured to monitor an uplink (UL) downlink control information (DCI) format that includes first information for scheduling an enhanced ultra-reliable low-latency communication (URLLC) service on a physical uplink shared channel (PUSCH). The higher layer processor is also configured to monitor a downlink (DL) DCI format that includes second information for scheduling the enhanced URLLC service on a physical downlink shared channel (PDSCH).

5 Claims, 17 Drawing Sheets

(51) Int. Cl.
*H04W 72/23* (2023.01)
*H04W 72/56* (2023.01)

(58) Field of Classification Search
USPC .......................................................... 370/329
See application file for complete search history.

(56) References Cited

U.S. PATENT DOCUMENTS

| 11,457,434 | B2* | 9/2022 | Ying | H04L 1/0061 |
| 11,711,836 | B2* | 7/2023 | Tang | H04W 72/535 |
| | | | | 370/329 |
| 2018/0323909 | A1* | 11/2018 | Ying | H04L 1/1822 |
| 2019/0082403 | A1* | 3/2019 | Lee | H04W 74/0833 |
| 2019/0123879 | A1* | 4/2019 | Wang | H04L 1/1864 |
| 2019/0149365 | A1* | 5/2019 | Chatterjee | H04L 5/0094 |
| | | | | 370/329 |
| 2019/0222284 | A1* | 7/2019 | Huang | H04W 72/23 |
| 2019/0254053 | A1* | 8/2019 | Ying | H04L 5/00 |
| 2019/0394759 | A1* | 12/2019 | Ying | H04L 1/0061 |
| 2020/0136787 | A1* | 4/2020 | Reial | H04B 7/0695 |
| 2021/0392630 | A1* | 12/2021 | Ying | H04W 72/0446 |

OTHER PUBLICATIONS

3GPP TS 38.211 V15.4.0 (Dec. 2018) 3rd Generation Partnership Project; Technical Specification Group Radio Access Network; NR; Physical channels and modulation (Release 15).

3GPP TS 38.212 V15.4.0 (Dec. 2018) 3rd Generation Partnership Project; Technical Specification Group Radio Access Network; NR; Multiplexing and channel coding (Release 15).

3GPP TS 38.214 V15.4.0 (Dec. 2018) 3rd Generation Partnership Project; Technical Specification Group Radio Access Network; NR; Physical layer procedures for data (Release 15).

3GPP TS 38.213 V15.4.0 (Dec. 2018) 3rd Generation Partnership Project; Technical Specification Group Radio Access Network; NR; Physical layer procedures for control (Release 15).

Ericsson, "Maintenance issues of physical downlink control channel", R1-1811488 3GPP TSG-RAN WG1 Meeting #94bis, Chengdu, China, Oct. 8-12, 2018.

Huawei, "Text proposal for TR 38.824 Section 6.1", R1-1903826 3GPP TSG RAN WG1 Meeting #96, Athens, Greece, Feb. 25-Mar. 1, 2019.

NTT DOCOMO, Inc., "DCI contents and formats", R1-1800671 3GPP TSG RAN WG1 Meeting AH 1801, Vancouver, Canada, Jan. 22-26, 2018.

* cited by examiner

USER EQUIPMENTS, BASE STATIONS AND METHODS FOR A CONFIGURABLE DOWNLINK CONTROL INFORMATION FORMAT

TECHNICAL FIELD

The present disclosure relates generally to communication systems. More specifically, the present disclosure relates to user equipments, base stations and methods for a configurable downlink control information (DCI) format.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) comprising: receiving circuitry configured to receive a radio resource control (RRC) message comprising first information used for a first physical uplink shared channel (PUSCH) transmission scheduled by a first downlink control information (DCI) format, the first information comprising a first parameter for defining antenna ports, a second parameter for defining carrier(s), a third parameter for defining priority, and a first allocation table used for defining a time domain allocation, the receiving circuitry configured to receive a RRC message comprising second information used for a second PUSCH transmission scheduled by a second DCI format, the second information comprising a fourth parameter for defining antenna ports, a fifth parameter for defining carrier(s), a sixth parameter for defining priority, and a second allocation table used for defining a time domain allocation, transmitting circuitry configured to perform, based on a detection of the first DCI format, the first PUSCH transmission according to the first information, the transmitting circuitry configured to perform, based on a detection of the second DCI format, the second PUSCH transmission according to the second information, wherein the first DCI format and the second DCI format are monitored in different search spaces.

In one example, a base station apparatus comprising: transmitting circuitry configured to transmit a radio resource control (RRC) message comprising first information used for a first physical uplink shared channel (PUSCH) transmission scheduled by a first downlink control information (DCI) format, the first information comprising a first parameter for defining antenna ports, a second parameter for defining carrier(s), a third parameter for defining priority, and a first allocation table used for defining a time domain allocation, the transmitting circuitry configured to transmit a RRC message comprising second information used for a second PUSCH transmission scheduled by a second DCI format, the second information comprising a fourth parameter for defining antenna ports, a fifth parameter for defining carrier(s), a sixth parameter for defining priority, and a second allocation table used for defining a time domain allocation, receiving circuitry configured to receive, based on a transmission of the first DCI format, the first PUSCH transmission according to the first information, the receiving circuitry configured to receive, based on a transmission of the second DCI format, the second PUSCH transmission according to the second information, wherein the first DCI format and the second DCI format are monitored in different search spaces.

In one example, a communication method of a user equipment (UE) comprising: receiving a radio resource control (RRC) message comprising first information used for a first physical uplink shared channel (PUSCH) transmission scheduled by a first downlink control information (DCI) format, the first information comprising a first parameter for defining antenna ports, a second parameter for defining carrier(s), a third parameter for defining priority, and a first allocation table used for defining a time domain allocation, receiving a RRC message comprising second information used for a second PUSCH transmission scheduled by a second DCI format, the second information comprising a fourth parameter for defining antenna ports, a fifth parameter for defining carrier(s), a sixth parameter for defining priority, and a second allocation table used for defining a time domain allocation, transmitting, based on a detection of the first DCI format, the first PUSCH transmission according to the first information, transmitting, based on a detection of the second DCI format, the second PUSCH transmission according to the second information, wherein the first DCI format and the second DCI format are monitored in different search spaces.

In one example, a communication method of a base station apparatus comprising:
transmitting a radio resource control (RRC) message comprising first information used for a first physical uplink shared channel (PUSCH) transmission scheduled by a first downlink control information (DCI) format, the first information comprising a first parameter for defining antenna ports, a second parameter for defining carrier(s), a third parameter for defining priority, and a first allocation table used for defining a time domain allocation, transmitting a RRC message comprising second information used for a second PUSCH transmission scheduled by a second DCI format, the second information comprising a fourth parameter for defining antenna ports, a fifth parameter for defining carrier(s), a sixth parameter for defining priority, and a second allocation table used for defining a time domain allocation, receiving, based on a transmission of the first DCI format, the first PUSCH transmission according to the first information, receiving, based on a transmission of the second DCI format, the second PUSCH transmission according to the second information, wherein the first DCI format and the second DCI format are monitored in different search spaces.

DESCRIPTION OF EMBODIMENTS

Figure 1:
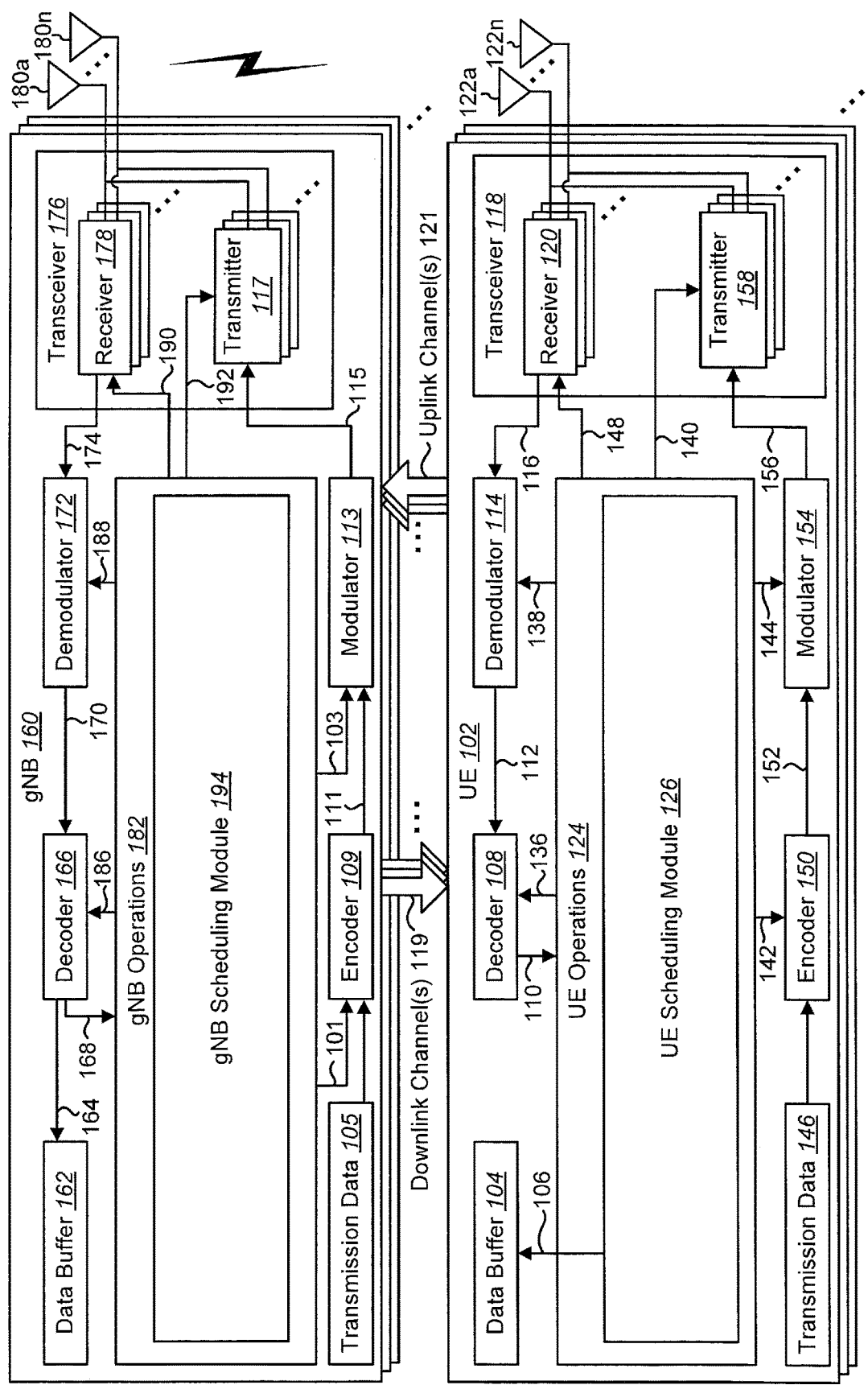
FIG. 1 is a block diagram illustrating one implementation of one or more base stations (gNBs) and one or more user equipments (UEs) in which systems and methods for a configurable downlink control information (DCI) format may be implemented.

A user equipment (UE) is described. The UE includes a higher layer processor configured to monitor an uplink (UL) downlink control information (DCI) format that includes first information for scheduling an enhanced ultra-reliable low-latency communication (URLLC) service on a physical uplink shared channel (PUSCH). The higher layer processor is also configured to monitor a downlink (DL) DCI format that includes second information for scheduling the enhanced URLLC service on a physical downlink shared channel (PDSCH).

The first information of the UL DCI format may include at least one of antenna port information, a transmission configuration indication, a sounding reference signals (SRS) request, a carrier indication, a channel state information (CSI) request, a beta_offset indicator, an SRS resource indicator, a repetition factor, a priority indication, or a time domain resource assignment.

The second information DL DCI format may include at least one of antenna port information, a transmission configuration indication, an SRS request, a carrier indication, a repetition factor, a priority indication, a rate matching indicator, a physical resource block (PRB) bundling size indicator, zero power (ZP) channel state information-reference signal (CSI-RS) triggering, or a time domain resource assignment.

In an approach, the UL DCI format and DL DCI format are new DCI formats. In another approach, the first information of the UL DCI format and the second information of the DL DCI format modify 3GPP Release-15 DCI formats. Fields in the 3GPP Release-15 DCI formats may be reinterpreted to determine the first information and the second information.

A base station (gNB) is also described. The gNB includes a higher layer processor configured to generate a UL DCI format that includes first information for scheduling an enhanced URLLC service on a PUSCH. The higher layer processor is also configured to generate a DL DCI format that includes second information for scheduling the enhanced URLLC service on a PDSCH.

A method by a UE is also described. The method includes monitoring a UL DCI format that includes first information for scheduling an enhanced URLLC service on a PUSCH. The method also includes monitoring a DL DCI format that includes second information for scheduling the enhanced URLLC service on a PDSCH.

A method by a gNB is also described. The method includes generating a UL DCI format that includes first information for scheduling an enhanced URLLC service on a PUSCH. The method also includes generating a DL DCI format that includes second information for scheduling the enhanced URLLC service on a PDSCH.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

For enhanced URLLC service and/or other services in future releases, the current DCI format (e.g., DCI format 0_0, DCI format 0_1) in 3GPP Release 15 may not be supportive. More information may be necessary to be included in DCI (e.g., antenna port(s), transmission configuration indication, rate matching indicator, SRS request, PRB bundling size indicator, carrier indicator, CSI request, ZP CSI-RS triggering, beta offset indicator, SRS resource indicator, repetition factor, priority indication, and so on). In this case, a new DCI format and/or current DCI format with modifications and/or enhancements may be introduced.

Some configurations of the systems and methods described herein teach approaches for URLLC transmission and/or retransmission management to meet the latency and/or reliability requirement. Some requirements for URLLC relate to user (U)-plane latency and reliability. For URLLC, the target user plane latency is 0.5 milliseconds (ms) each way for both UL and DL. The target reliability is $1-10^{-5}$ for X bytes within 1 milliseconds (ms).

These URLLC-specific constraints make the hybrid automatic repeat request (HARQ) and retransmission mechanism design difficult. For example, the receiver must reply with a quick acknowledgement (ACK) or negative acknowledgement (NACK) or an uplink grant to meet the latency requirement, or the transmitter can retransmit immediately without waiting for ACK/NACK to enhance the reliability. On the other, grant-based or grant-free repetitions are supported to further enhance the reliability. How to terminate the repetitions is also an important issue. The described systems and methods teach URLLC HARQ and/or retransmission design in different cases.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) 160 and one or more user equipments (UEs) 102 in which systems and methods for a configurable downlink control information (DCI) format may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform operations for a configurable downlink control information (DCI) format. In new radio (NR), a UE 102 may support multiple types of UL transmissions (PUSCH transmissions). The UL transmissions may include grant-based UL transmissions (e.g., UL transmissions with grant, dynamic grants, PUSCH transmissions with grant, PUSCH transmission scheduled by DCI (e.g., DCI format 0_0, DCI format 0_1)) and grant-free UL transmissions (e.g., UL transmissions without grant, configured grants, PUSCH transmissions with configured grant).

There may be two types of grant-free UL transmissions (e.g., UL transmissions without grant, with configured grants, PUSCH transmissions with configured grant). One type of grant-free UL transmission is a configured grant Type 1 and the other is configured grant Type 2.

For Type 1 PUSCH transmissions with a configured grant, related parameters may be fully RRC-configured (e.g., configured by using RRC signaling). For example, parameters for resource allocation, such as time domain resource allocation (e.g., timeDomainOffset, timeDomainAllocation), frequency domain resource allocation (frequencyDomainAllocation), modulation and coding scheme (MCS) (e.g., mcsAndTBS), the antenna port value, the bit value for DMRS sequence initialization, precoding information and number of layers, SRS resource indicator (provided by antennaPort, dmrs-SeqInitialization, precodingAndNumberOfLayers, and srsResourceIndicator respectively), the frequency offset between two frequency hops (frequencyHoppingOffset), etc., may be provided by RRC message (rrc-ConfiguredUplinkGrant).

Activation (e.g., PDCCH, DCI activation) may not be used for Type 1 configured grant. Namely, for configured grant Type 1, an uplink grant is provided by RRC, and stored as configured uplink grant. The retransmission of configured grant type 1 may be scheduled by PDCCH with CRC scrambled by CS-RNTI (Configured Scheduling RNTI).

For Type 2 PUSCH transmissions with a configured grant, the related parameters follow the higher layer configuration (e.g., periodicity, the number of repetitions, etc.), and UL grant received on the DCI addressed to CS-RNTI (PDCCH with CRC scrambled by CS-RNTI, L1 activation and/or reactivation). Namely, for configured grant Type 2, an uplink grant may be provided by PDCCH, and stored or cleared as a configured uplink grant based on L1 signaling indicating configured uplink grant activation or deactivation.

The retransmission of configured grant type 2 may be scheduled by PDCCH with CRC scrambled by CS-RNTI. Namely, retransmissions except for repetition of configured uplink grants may use uplink grants addressed to CS-RNTI. The UE 102 may not transmit anything on the resources configured for PUSCH transmissions with configured grant if the higher layers did not deliver a transport block to transmit on the resources allocated for uplink transmission without grant.

Therefore, in NR, a UE 102 may support multiple types of uplink transmissions without grant (also referred to as grant-free (GF) uplink transmission or GF transmission or transmission by configured grant). A first type (Type 1) of GF transmission may be a UL data transmission without grant that is only based on RRC (re)configuration without any L1 signaling. In a second type (Type 2) of GF transmission, UL data transmission without grant is based on both RRC configuration and L1 signaling for activation and/or deactivation for UL data transmission without grant. An example for RRC configuration is shown in Listing 1.

Listing 1

```
-- ASN1START
-- TAG-CONFIGUREDGRANTCONFIG-START
ConfiguredGrantConfig ::=      SEQUENCE {
    frequencyHopping           ENUMERATED
                               {mode1, mode2}
                                   OPTIONAL,   -- Need S,
    cg-DMRS-Configuration      DMRS-UplinkConfig,
    mcs-Table                  ENUMERATED
                               {qam256, spare1}
                                   OPTIONAL,   -- Need S
    mcs-TableTransformPrecoder ENUMERATED
                               {qam256, spare1}
                                   OPTIONAL,   -- Need S
```

Listing 1
-continued

```
uci-OnPUSCH                    SetupRelease {
                                 CG-UCI-OnPUSCH },
resourceAllocation             ENUMERATED {
                                 resourceAllocationType0,
                                 resourceAllocationType1,
                                 dynamicSwitch },
rbg-Size                       ENUMERATED {config2}
                                 OPTIONAL,  -- Need S
powerControlLoopToUse          ENUMERATED {n0, n1},
p0-PUSCH-Alpha                 P0-PUSCH-AlphaSetId,
transformPrecoder              ENUMERATED {enabled}
nrofHARQ-Processes             INTEGER(1..16),
repK                           ENUMERATED
                                 {n1, n2, n4, n8},
repK-RV                        ENUMERATED {s1-0231,
                                             s2-0303,
                                             s3-0000}
                                 OPTIONAL,  -- Cond RepK
periodicity                    ENUMERATED {
                                 sym2, sym7, sym1x14,
                                 sym2x14, sym4x14,
                                 sym5x14, sym8x14,
                                 sym10x14, sym16x14,
                                 sym20x14, sym32x14,
                                 sym40x14, sym64x14,
                                 sym80x14, sym128x14,
                                 sym160x14, sym256x14,
                                 sym320x14, sym512x14,
                                 sym640x14, sym1024x14,
                                 sym1280x14, sym2560x14,
                                 sym5120x14, sym6,
                                 sym1x12, sym2x12,
                                 sym4x12, sym5x12,
                                 sym8x12, sym10x12,
                                 sym16x12, sym20x12,
                                 sym32x12, sym40x12,
                                 sym64x12, sym80x12,
                                 sym128x12, sym160x12,
                                 sym256x12, sym320x12,
                                 sym512x12, sym640x12,
                                 sym1280x12, sym2560x12
                               },
configuredGrantTimer           INTEGER (1..64)
                                 OPTIONAL,  -- Need R
rrc-ConfiguredUplinkGrant      SEQUENCE {
  timeDomainOffset               INTEGER (0..5119),
  timeDomainAllocation           INTEGER (0..15),
  frequencyDomainAllocation      BIT STRING (SIZE)18)),
  antennaPort                    INTEGER (0..31),
  dmrs-SeqInitialization         INTEGER (0..1)
                     OPTIONAL, -- Cond NoTransformPrecoder
  precodingAndNumberOfLayers     INTEGER (0..63),
  srs-ResourceIndicator          INTEGER (0..15),
  mcsAndTBS                      INTEGER (0..31),
  frequencyHoppingOffset         INTEGER (1..
                   maxNrofPhysicalResourceBlocks-1)
                   OPTIONAL, -- Need M
  pathlossReferenceIndex         INTEGER (0..
                   maxNrofPUSCH-PathlossReferenceRSs-1),
  ...
}
    OPTIONAL -- Need R
}
CG-UCI-OnPUSCH ::= CHOICE {
  dynamic         SEQUENCE (SIZE (1..4)) OF BetaOffsets,
  semiStatic      BetaOffsets
}
-- TAG-CONFIGUREDGRANTCONFIG-STOP
-- ASN1STOP
```

For Type 2, PDCCH activation is needed. Listing 2 and Listing 3 show examples of DCI format 0_0 (e.g., fallback DCI) and format 0_1, which may be used for activation of a Type 2 configured grant, and/or retransmission of Type 2 configured grant and/or Type 1 configured grant.

Listing 2

Identifier for DCI formats - [1] bit
Frequency domain resource assignment
Time domain resource assignment - 0-4 bits as defined in Subclause 6.1.2.1 of [6, TS38.214]
Frequency hopping flag - 1 bit.
Modulation and coding scheme - 5 bits as defined in Subclause 6.1.3 of [6, TS38.214]
New data indicator - 1 bit
Redundancy version - 2 bits as defined in Table 7.3.1.1.1-2
HARQ process number - 4 bits
TPC command for scheduled PUSCH - [2] bits as defined in Subclause x.x of [5, TS38.213]
UL/SUL indicator - 1 bit for UEs configured with SUL in the cell as defined in Table 7.3.1.1.1-1 and the number of bits for DCI format 1_0 before padding is larger than the number of bits for DCI format 0_0 before padding; 0 bit otherwise.

Listing 3

Carrier indicator - 0 or 3 bits, as defined in Subclause x.x of [5, TS38.213],
UL/SUL indicator - 0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1 [TS38.212],
Identifier for DCI formats - [1] bit
Bandwidth part indicator - 0, 1 or 2 bits as defined in Table 7.3.1.1.2-1 [TS38.212], The bitwidth for this field is determined according to the higher layer parameter BandwidthPart-Config for the PUSCH.
Frequency domain resource assignment
Time domain resource assignment - 0, 1, 2, 3, or 4 bits as defined in Subclause 6.1.2.1 of [6, TS38.214]. The bitwidth for this field is determined as $\lceil \log_2 (I) \rceil$ bits, where I the number of rows in the higher layer parameter [pusch-symbolAllocation].
VRB-to-PRB mapping - 0 or 1 bit
Frequency hopping flag - 0 or 1 bit
New data indicator - 1 bit
Redundancy version - 2 bits as defined in Table 7.3.1.1.1-2
HARQ process number - 4 bits
$1^{st}$ downlink assignment index - 1 or 2 bits
$2^{nd}$ downlink assignment index - 0 or 2 bits
TPC command for scheduled PUSCH - 2 bits as defined in Subclause 7.1.1 of [5, TS38.213]
SRS resource indicator
Precoding information and number of layers - number of bits determined by the following:
Antenna ports - number of bits determined by the following
SRS request - 2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24.
CSI request - 0, 1, 2, 3, 4, 5, or 6 bits determined by higher layer parameter ReportTriggerSize.
CBG transmission information (CBGTI) - 0, 2, 4, 6, or 8 bits determined by higher layer parameter maxCodeBlockGroupsPerTransportBlock for PUSCH.
PTRS-DMRS association - number of bits determined as follows
beta_offset indicator - 0 if the higher layer parameter dynamic in uci-on-PUSCH is not configured; otherwise 2 bits as defined by Table 7.3.1.1.2-27.
DMRS sequence initialization - 0 if the higher layer parameter PUSCH-tp = Enabled or 1 bit if the higher layer parameter PUSCH-tp = Disabled for $n_{SCID}$ selection defined in Subclause 7.4.1.1.1 of [4, TS38.211].

For both Type 1 and Type 2 PUSCH transmissions with a configured grant, when the UE 102 is configured with repK>1, the UE 102 may repeat the TB across the repK consecutive slots applying the same symbol allocation in each slot. The parameter repK may be referred as the configured number of transmission occasions for repetitions (including initial transmission) for a TB. If the UE procedure for determining slot configuration determines symbols of a slot allocated for PUSCH as downlink symbols, the transmission on that slot may be omitted for multi-slot PUSCH transmission.

For grant-based transmission, PUSCH transmission is scheduled by DCI (e.g., the DCI format 0_0 and the DCI format 0_1 shown above). The PUSCH may be assigned (e.g., scheduled) by a DCI format 0_0/0_1 with CRC scrambled by C-RNTI, a new-RNTI (e.g., a first RNTI), TC-RNTI, or SP-CSI-RNTI. The new-RNTI may be called MCS-C-RNTI in specifications. Some UE-specific PUSCH parameters may be configured by RRC. An example for RRC configuration is shown in Listing 4. For example, pusch-AggregationFactor in PUSCH-Config indicates number of repetitions for data. When the UE 102 is configured with pusch-AggregationFactor>1, the same symbol allocation may be applied across the pusch-AggregationFactor consecutive slots and the PUSCH may be limited to a single transmission layer. The UE 102 may repeat the transport block (TB) across the pusch-AggregationFactor consecutive slots applying the same symbol allocation in each slot. If the UE procedure for determining the slot configuration, determines symbols of a slot allocated for PUSCH as downlink symbols, the transmission on that slot may be omitted for multi-slot PUSCH transmission.

For the PUSCH retransmission scheduled by a PDCCH with CRC scrambled by CS-RNTI with new data indicator (NDI) equal to 1 (i.e., NDI=1), if the UE 102 is configured with pusch-AggregationFactor, the same symbol allocation may be applied across the pusch-AggregationFactor consecutive slots and the PUSCH may be limited to a single transmission layer. The UE 102 may repeat the TB across the pusch-AggregationFactor consecutive slots applying the same symbol allocation in each slot.

Listing 4

```
-- ASN1START
-- TAG-PUSCH-CONFIG-START
PUSCH-Config ::=                    SEQUENCE {
    dataScramblingIdentityPUSCH         INTEGER (0..1023)
                                        OPTIONAL,   -- Need M
    txConfig                            ENUMERATED {codebook,
                                                    nonCodebook}
                                        OPTIONAL,   -- Need S
    dmrs-UplinkForPUSCH-                SetupRelease {
        MappingTypeA
                                            DMRS-UplinkConfig }
                                        OPTIONAL,   -- Need M
    dmrs-UplinkForPUSCH-                SetupRelease {
        MappingTypeB
                                            DMRS-UplinkConfig }
                                        OPTIONAL,   -- Need M
    pusch-PowerControl                  PUSCH-PowerControl
                                        OPTIONAL,   -- Need M
    frequencyHopping                    ENUMERATED {mode1,
                                                    mode2}
                                        OPTIONAL,   -- Need S
    frequencyHoppingOffsetLists         SEQUENCE (SIZE (1..4)) OF
                INTEGER (1.. maxNrofPhysicalResourceBlocks-1)
                                        OPTIONAL,   -- Need M
    resourceAllocation                  ENUMERATED {
                                            resourceAllocationType0,
                                            resourceAllocationType1,
                                            dynamicSwitch1,
    pusch-TimeDomainAllocationList      SetupRelease {
            PUSCH-TimeDomainResourceAllocationList }
                                        OPTIONAL,   -- Need M
    pusch-AggregationFactor             ENUMERATED { n2, n4, n8 }
                                        OPTIONAL,   -- Need S
    mcs-Table                           ENUMERATED { qam256,
                                                    spare1}
```

Listing 4
-continued

```
                                        OPTIONAL,   -- Need S
    mcs-TableTransformPrecoder          ENUMERATED {qam256,
                                                    spare1}
                                        OPTIONAL,   -- Need S
    transformPrecoder                   ENUMERATED {enabled,
                                                    disabled}
                                        OPTIONAL,   -- Need S
    codebookSubset                      ENUMERATED {
                                            fullyAndPartialAndNonCoherent,
                                            partialAndNonCoherent,
                                            nonCoherent}
                                        OPTIONAL,   -- Cond codebookBased
    maxRank                             INTEGER (1..4)
                                        OPTIONAL,   -- Cond codebookBased
    rbg-Size                            ENUMERATED { config2}
                                        OPTIONAL,   -- Need S
    uci-OnPUSCH                         SetupRelease {
                                            UCI-OnPUSCH}
                                        OPTIONAL,   -- Need M
    tp-pi2BPSK                          ENUMERATED {enabled}
                                        OPTIONAL,   -- Need S
    ...
}
UCI-OnPUSCH ::=                     SEQUENCE {
    betaOffsets                         CHOICE {
        dynamic                             SEQUENCE (SIZE (4)) OF
                                            BetaOffsets,
        semiStatic                          BetaOffsets
    }
                                        OPTIONAL,   -- Need M
    scaling                             ENUMERATED { f0p5, f0p65,
                                                    f0p8, f1 }
}
-- TAG-PUSCH-CONFIG-STOP
-- ASN1STOP
```

For enhanced URLLC service and/or other services in future releases, the current DCI format (e.g., DCI format 0_0, DCI format 0_1) in 3GPP Release 15 (also referred to as Rel-15) may not be supportive. More information may be necessary to be included in DCI (e.g., antenna port(s), transmission configuration indication, rate matching indicator, SRS request, PRB bundling size indicator, carrier indicator, CSI request, ZP CSI-RS triggering, beta offset indicator, SRS resource indicator, repetition factor, priority indication, and so on). In this case, a new DCI format and/or current DCI format with modifications and/or enhancements may be introduced.

In a design, a new DCI format (e.g., DCI format 0_2, specifications may use a different name) may be introduced. DCI format 0_2 may be used for the scheduling of PUSCH in one cell. The following information may be transmitted by means of the DCI format 0_2.

DCI format 0_2 may include an identifier for DCI formats. The value of this field may be set to a predefined and/or defaulted value (e.g., 0 or 1), indicating a new/different DCI format (comparing to DCI format 0_0 and/or DCI format 0_1) for enhanced URLLC and/or other services.

DCI format 0_2 may include an identifier for UL/DL DCI formats. The value of this field may be set to a predefined and/or defaulted value (e.g., 0 or 1), indicating an UL DCI format.

DCI format 0_2 may include antenna ports. The number of bits in this bit field may be 0-2 bits. The number of bits in this bit field may be determined by higher layer (e.g., RRC configuration, an explicit high layer parameter). The number of bits in this bit field may be determined by configured waveform (e.g., whether transform precoder is enabled or not). The number of bits in this bit field may be determined by DMRS type, rank, codebook and/or any other related high layer parameters. Any of the high layer parameters used to determine the number of bits in this field may be commonly configured for DCI format 0_2 and other DCI formats, or separately configured for DCI format 0_2. In other words, parameter(s) configured for Rel-15 DCI format(s) field size determination may be also used to determine the number of bits in the corresponding bit field for DCI format 0_2, or parameter(s) used to determine the number of bits in the corresponding bit field for DCI format 0_2 may be configured separately.

DCI format 0_2 may include a transmission configuration indication. The number of bits in this bit field may be 0-3 bits. The number of bits in this bit field may be determined by higher layer (e.g., RRC configuration, an explicit high layer parameter). The number of bits in this bit field may be determined by a configured number of multiple transmission configurations. For example, if multiple configurations are not enabled, the number of bits in this field is 0 or this bit field is absent in DCI. If the number of transmission configuration is 8, the number of bits in this field may be 3. If multiple transmission configurations are enabled and/or configured, only DCI format 0_2 may be used to activate and/or deactivate corresponding configured grant(s).

DCI format 0_2 may include an SRS request. The number of bits in this bit field may be 0-2 bits. The number of bits in this bit field may be determined by higher layer (e.g., RRC configuration, an explicit high layer parameter). The number of bits in this bit field may be determined by configured carrier (e.g., whether SUL is configured or not). The number of bits in this bit field may be determined by a configured and/or predefined table and/or any other related high layer parameters. Any of the high layer parameters used to determine the number of bits in this field may be commonly configured for DCI format 0_2 and other DCI formats, or separately configured for DCI format 0_2. In other words, parameter(s) and/or table(s) configured for Rel-15 DCI format(s) field size determination may be also used to determine the number of bits in the corresponding bit field for DCI format 0_2, or parameter(s) used to determine the number of bits in the corresponding bit field for DCI format 0_2 may be configured separately.

DCI format 0_2 may include a carrier indication. The number of bits in this bit field may be 0-3 bits. The number of bits in this bit field may be determined by higher layer (e.g., RRC configuration, an explicit high layer parameter). The number of bits in this bit field may be determined by a configured number of carriers. For example, if multiple carriers are not enabled and/or configured, the number of bits in this field is 0 or this bit field is absent in DCI. If the number of carriers is larger than 4, the number of bits in this field may be 3. Any of the high layer parameters used to determine the number of bits in this field may be commonly configured for DCI format 0_2 and other DCI formats, or separately configured for DCI format 0_2. In other words, parameter(s) and/or table(s) configured for Rel-15 DCI format(s) field size determination may be also used to determine the number of bits in the corresponding bit field for DCI format 0_2, or parameter(s) used to determine the number of bits in the corresponding bit field for DCI format 0_2 may be configured separately.

DCI format 0_2 may include a CSI request. The number of bits in this bit field may be 0-3 bits. The number of bits in this bit field may be determined by higher layer (e.g., RRC configuration, an explicit high layer parameter). The number of bits in this bit field may be determined by CSI configuration. The number of bits in this bit field may be determined by a configured and/or predefined table, and/or any other related high layer parameters. Any of the high layer parameters used to determine the number of bits in this field may be commonly configured for DCI format 0_2 and other DCI formats, or separately configured for DCI format 0_2. In other words, parameter(s) and/or table(s) configured for Rel-15 DCI format(s) field size determination may be also used to determine the number of bits in the corresponding bit field for DCI format 0_2, or parameter(s) used to determine the number of bits in the corresponding bit field for DCI format 0_2 may be configured separately.

DCI format 0_2 may include a beta_offset indicator. The number of bits in this bit field may be 0-2 bits. The number of bits in this bit field may be determined by higher layer (e.g., RRC configuration, an explicit high layer parameter). The number of bits in this bit field may be determined by beta_offset configuration type (e.g., whether beta_offset is semi-static or dynamic). The number of bits in this bit field may be determined by the configured set of beta_offsets. The number of bits in this bit field may be determined by a configured and/or predefined table, and/or any other related high layer parameters. Any of the high layer parameters used to determine the number of bits in this field may be commonly configured for DCI format 0_2 and other DCI formats, or separately configured for DCI format 0_2. In other words, parameter(s) and/or table(s) configured for Rel-15 DCI format(s) field size determination may be also used to determine the number of bits in the corresponding bit field for DCI format 0_2, or parameter(s) used to determine the number of bits in the corresponding bit field for DCI format 0_2 may be configured separately.

DCI format 0_2 may include an SRS resource indicator. The number of bits in this bit field may be 0-4 bits. The number of bits in this bit field may be determined by higher layer (e.g., RRC configuration, an explicit high layer parameter). The number of bits in this bit field may be determined by the number of configured SRS resources in the SRS resource set. The number of bits in this bit field may be determined by the maximum number of supported layers for the PUSCH, codebook and/or any other related high layer parameters. Any of the high layer parameters used to determine the number of bits in this field may be commonly configured for DCI format 0_2 and other DCI formats, or separately configured for DCI format 0_2. In other words, parameter(s) configured for Rel-15 DCI format(s) field size determination may be also used to determine the number of bits in the corresponding bit field for DCI format 0_2, or parameter(s) used to determine the number of bits in the corresponding bit field for DCI format 0_2 may be configured separately.

DCI format 0_2 may include a repetition factor. The number of bits in this bit field may be 0-2 bits. The number of bits in this bit field may be determined by higher layer (e.g., RRC configuration, an explicit high layer parameter). The number of bits in this bit field may be determined by a configured and/or predefined set of repetition factors. For example, if dynamic indication of repetition factor is not enabled, configured and/or supported, the number of bits in this field is 0 or this bit field is absent in DCI. If dynamic indication of repetition factor is enabled, configured and/or supported, and/or the number of repetition factors in the configured and/or predefined set is 4 (e.g., {1, 2, 4, 8}), the number of bits in this field may be 2. Any of the high layer parameters, sets and/or tables used to determine the number of bits in this field may be commonly configured for DCI format 0_2 and other DCI formats, or separately configured for DCI format 0_2. In other words, parameter(s), table(s) and/or set(s) configured for Rel-15 DCI format(s) field size determination may be also used to determine the number of bits in the corresponding bit field for DCI format 0_2, or parameter(s), table(s) and/or set(s) used to determine the number of bits in the corresponding bit field for DCI format 0_2 may be configured separately.

DCI format 0_2 may include a priority indication. The number of bits in this bit field may be 0-3 bits. The number of bits in this bit field may be determined by higher layer (e.g., RRC configuration, an explicit high layer parameter). The number of bits in this bit field may be determined by a configured and/or predefined set of priority levels and or the number of configured and/or predefined priority levels. For example, if PUSCH prioritization is not enabled, configured and/or supported, the number of bits in this field is 0 or this bit field is absent in DCI. If the number of configured and/or predefined PUSCH priority levels is 4 (e.g., {1, 2, 4, 8}), the number of bits in this field may be 2. Any of the high layer parameters, sets and/or tables used to determine the number of bits in this field may be commonly configured for DCI format 0_2 and other DCI formats, or separately configured for DCI format 0_2. In other words, parameter(s), table(s) and/or set(s) configured for Rel-15 DCI format(s) field size determination may be also used to determine the number of bits in the corresponding bit field for DCI format 0_2, or parameter(s), table(s) and/or set(s) used to determine the number of bits in the corresponding bit field for DCI format 0_2 may be configured separately.

DCI format 0_2 may include a time domain resource assignment. The number of bits in this bit field may be 0-6 bits. The number of bits in this bit field may be determined by higher layer (e.g., RRC configuration, an explicit high layer parameter). The number of bits in this bit field may be determined by the number of entries in the time domain resource assignment table configured by high layer (e.g., RRC configuration) or a defaulted time domain resource assignment table. Any of the high layer parameters (e.g., configured time domain resource assignment table, defaulted and/or predefined time domain resource assignment table) used to determine the number of bits in this field may be commonly configured for DCI format 0_2 and other DCI formats, or separately configured for DCI format 0_2. In other words, parameter(s) (e.g., time domain resource assignment table configured by high layer) configured for Rel-15 DCI format(s) field size determination may be also applied to the corresponding bit field for DCI format 0_2, or parameter(s) and/or table(s) used to determine the number of bits in the corresponding bit field for DCI format 0_2 may be configured separately.

For example, first parameters (e.g., PUSCH-TimeDomainResourceAllocation) are used for configuring a time domain relation between the PDCCH (e.g., the DCI format 0_0, the DCI format 0_1, and/or the DCI format 0_2) and the PUSCH (e.g., the PUSCH transmission). For example, the first parameters may include information indicating an offset (e.g., a slot offset) to be applied for the PUSCH transmission. Also, the first parameters may include information indicating an index giving valid combinations of start symbol and length (also referred as to start and length indicator (SLIV)) to be applied for the PUSCH transmission. Also, the first parameters may include information indicating PUSCH mapping type to be applied for the PUSCH transmission.

Here, the gNB 160 may transmit, by using the RRC message, one or more sets of the first parameters (e.g., PUSCH-TimeDomainResourceAllocationList). And, the gNB 160 may indicate, by using a value (e.g., a value "m") of the time domain resource assignment field, one set of the first parameters among from the one or more sets of the first parameters. Namely, the gNB 160 may indicate, by using the value of the time domain resource assignment field, which of the configured first parameters the UE 102 apply for the PUSCH transmission.

Namely, in a case that the UE 102 detects the DCI format 0_0 and/or the DCI format 0_1 and/or the DCI format 0_2, the offset (e.g., the slot offset), the index for the start symbol and the length, and/or the PUSCH mapping type may be determined based on a value of time domain resource assignment field included in the DCI format 0_0 and/or the DCI format 0_1 and/or the DCI format 0_2. For example, the value (e.g., the value "m") of the time domain resource assignment field may be used for indicating a row index (e.g., a row index "m+1") of a first resource allocation table, and the first resource allocation table may be used for defining the one or more sets of the first parameters (e.g., the offset (e.g., the slot offset), the index for the start symbol and the length, and/or the PUSCH mapping type). Namely, the indexed row of the first resource allocation table may be used for defining the one or more sets of the first parameters (e.g., the offset (e.g., the slot offset), the index for the start symbol and the length, and/or the PUSCH mapping type). Here, the one or more sets of the first parameters (e.g., the offset (e.g., the slot offset), the index for the start symbol and the length, and/or the PUSCH mapping type) may be applied for the PUSCH transmission scheduled by using the DCI format 0_0 and/or the DCI format 0_1 and/or the DCI format 0_2.

Also, the number of bits (e.g., a size, and/or a bit width) of the time domain resource assignment field (e.g., a DCI field) may be determined based on the number of entries in the first resource allocation table (i.e., the number of entries in the PUSCH-TimeDomainResourceAllocationList). For example, the maximum number of the first allocation table (i.e., the maximum number of the first parameters (i.e., the PUSCH-TimeDomainResourceAllocation) in the PUSCH-Time-DomainResourceAllocationList) may be a first value (e.g., 16). Namely, the maximum number of bits of the time domain resource assignment field included in the DCI format 0_0 and/or the DCI format 0_1 and/or the DCI format 0_2 may be 4 bits (i.e., corresponding to the first value). For example, in a case that 5 sets of the first parameters (i.e., 5 entries of the first resource allocation table) are configured, the UE 102 may consider the number of bits of the time domain resource assignment field included in the DCI format 0_0 and/or the DCI format 0_1 and/or the DCI format 0_2 are 3 bits. Also, for example, in a case that 14 sets of the first parameters (i.e., 14 entries of the first resource allocation table) are configured, the UE 102 may consider the number of bits of the time domain resource assignment field included in the DCI format 0_0 and/or the DCI format 0_1 and/or the DCI format 0_2 are 4 bits.

Here, the one or more sets of the first parameters (e.g., PUSCH-TimeDomainResourceAllocationList) may be included in third information (e.g., PUSCH-ConfigCommon). For example, the third information may be used for configuring a cell specific PUSCH parameter(s). For example, system information (e.g., system information block 1) may include the third information. Also, the one or more sets of the first parameters (e.g., PUSCH-TimeDomainResourceAllocationList) may be included in fourth information (e.g., PUSCH-Config). For example, the fourth information may be used for configuring a UE specific parameter(s). For example, the dedicated RRC message may include the fourth information. For example, first sets of values of the first parameters may be included in the third information, and second sets of values of the first parameters may be included in the fourth information.

And, in a case that the UE 102 detects the PDCCH for the DCI format 0_0 and/or the DCI format 0_1 and/or the DCI format 0_2 in a common search space(s) (e.g., a common search space set(s)) associated with the CORESET 0, the one or more sets of the first parameters included in the third information may be used (e.g., applied for the PUSCH transmission). Also, in a case that the UE 102 detects the PDCCH for the DCI format 0_0 and/or the DCI format 0_1 and/or the DCI format 0_2 in a common search space(s) (e.g., a common search space set(s)) not associated with the CORESET 0, the one or more sets of the first parameters included in the fourth information may be used (e.g., applied for the PUSCH transmission). Also, in a case that the UE 102 detects the PDCCH for the DCI format 0_0 and/or the DCI format 0_1 and/or the DCI format 0_2 in a UE-specific search space(s) (e.g., a UE-specific search space set(s)), the one or more sets of the first parameter(s) included in the fourth information may be used (e.g., applied for the PUSCH transmission).

Also, in a case that the one or more sets of the first parameters included in the third information and the one or more sets of the first parameters included in the fourth information are not configured, a default value(s) of the first parameter(s) (e.g., a default time domain resource assignment(s)) may be used (e.g., applied for the PUSCH transmission). Here, the default value(s) of the first parameter(s) may be defined, in advance, by the specification and known information between the gNB 160 and the UE 102. For example, in a case that the one or more sets of the first parameters included in the third information and the one or more sets of the second parameters included in the fourth information are not configured, and in a case that the UE 102 detects the PDCCH for the DCI format 0_0 and/or the DCI format 0_1 and/or the DCI format 0_2 (e.g., in a common search space associated with the CORESET 0 and/or not associated with the CORESET 0, in a UE-specific search space), the default values of the first parameter(s) may be used (e.g., applied for the PUSCH transmission).

Also, second parameters (e.g., PUSCH-TimeDomainResourceAllocation2) are used for configuring a time domain relation between the PDCCH (e.g., the DCI format 0_2) and the PUSCH (e.g., the PUSCH transmission). For example, the second parameters may include information indicating an offset (e.g., a slot offset and/or a symbol offset) to be applied for the PUSCH transmission. Also, the second parameters may include information indicating an index giving valid combinations of start symbol and length (also referred as to start and length indicator (SLIV)) to be applied for the PUSCH transmission. Also, the second parameters may include information indicating PUSCH mapping type to be applied for the PUSCH transmission.

Here, the gNB 160 may transmit, by using the RRC message, one or more sets of the second parameters (e.g., PUSCH-TimeDomainResourceAllocationList2). And, the gNB 160 may indicate, by using a value (e.g., a value "m") of the time domain resource assignment field, one set of the first parameters among from the one or more sets of the first parameters. Namely, the gNB 160 may indicate, by using the value of the time domain resource assignment field, which of the configured first parameters the UE 102 apply for the PUSCH transmission.

Namely, in a case that the UE 102 detects the DCI format 0_2, the offset (e.g., the slot offset and/or the symbol offset), the index for the start symbol and the length, and/or the PUSCH mapping type may be determined based on a value of time domain resource assignment field included in the DCI format 0_2. For example, the value (e.g., the value "m") of the time domain resource assignment field may be used for indicating a row index (e.g., a row index "m+1") of a second resource allocation table, and the second resource allocation table may be used for defining the one or more sets of the second parameters (e.g., the offset (e.g., the slot offset and/or the symbol offset), the index for the start symbol and the length, and/or the PUSCH mapping type). Namely, the indexed row of the second resource allocation table may be used for defining the one or more sets of the second parameters (e.g., the offset (e.g., the slot offset and/or the symbol offset), the index for the start symbol and the length, and/or the PUSCH mapping type). Here, the one or more sets of the second parameters (e.g., the offset (e.g., the slot offset and/or the symbol offset), the index for the start symbol and the length, and/or the PUSCH mapping type) may be applied for the PUSCH transmission scheduled by using the DCI format 0_2.

Also, the number of bits (e.g., a size, and/or a bit width) of the time domain resource assignment field (e.g., a DCI field) may be determined based on the number of entries in the second resource allocation table (i.e., the number of entries in the PUSCH-TimeDomainResourceAllocationList2). For example, the maximum number of the second allocation table (i.e., the maximum number of the second parameters (i.e., the PUSCH-TimeDomainResourceAllocation2) in the PUSCH-TimeDomainResourceAllocationList2) may be a second value (e.g., 64). Namely, the maximum number of bits of the time domain resource assignment field included in the DCI format 0_2 may be 6 bits (i.e., corresponding to the first value). For example, in a case that 5 sets of the second parameters (i.e., 5 entries of the second resource allocation table) are configured, the UE 102 may consider the number of bits of the time domain resource assignment field included in the DCI format 0_2 are 3 bits. Also, for example, in a case that 50 sets of the second parameters (i.e., 50 entries of the second resource allocation table) are configured, the UE 102 may consider the number of bits of the time domain resource assignment field included in the DCI format 0_2 are 6 bits.

Here, the number of bits of the time domain resource assignment field may be fixed (e.g., 5 bits). Namely, the UE 102 may consider the number of bits of the time domain resource assignment field is always fixed (e.g., 5 bits). Namely, the number of entries in the second resource allocation table may be fixed (e.g., 32 entries corresponding to 5 bits). For example, in a case that the number of entries in the second resource allocation is fixed (e.g., in a case that the number of bits of the time domain resource assignment field is fixed), the one or more sets of the second parameters may be defined, in advance, by the specification. Also, in a case that the number of entries in the second resource allocation is fixed (e.g., in a case that the number of bits of the time domain resource assignment field is fixed), the gNB 160 may always configure a fixed number of sets of the second parameters (e.g., a fixed number (e.g., 32) of the PUSCH-TimeDomainResourceAllocation2) in the PUSCH-Time-DomainResourceAllocationList2.

Here, the one or more sets of the second parameters (e.g., PUSCH-TimeDomainResourceAllocationList2) may be included in third information (e.g., PUSCH-ConfigCommon). Also, the one or more sets of the second parameters (e.g., PUSCH-TimeDomainResourceAllocationList2) may be included in fourth information (e.g., PUSCH-Config). For example, first sets of values of the second parameters may be included in the third information, and second sets of values of the second parameters may be included in the fourth information.

And, in a case that the UE 102 detects the PDCCH for the DCI format 0_2 in a common search space(s) associated with the CORESET 0, the one or more sets of the second parameters included in the third information may be used (e.g., applied for the PUSCH transmission). Also, in a case that the UE 102 detects the PDCCH for the DCI format 0_2 in a common search space(s) not associated with the CORESET 0, the one or more sets of the second parameters included in the fourth information may be used (e.g., applied for the PUSCH transmission). Also, in a case that the UE 102 detects the PDCCH for the DCI format 0_2 in a UE-specific search space(s), the one or more sets of the second parameter(s) included in the fourth information may be used (e.g., applied for the PUSCH transmission).

Also, in a case that the one or more sets of the second parameters included in the third information and the one or more sets of the second parameters included in the fourth information are not configured, a default value(s) of the second parameter(s) (e.g., a default time domain resource assignment(s)) may be used (e.g., applied for the PUSCH transmission). Here, the default value(s) of the second parameter(s) may be defined, in advance, by the specification and known information between the gNB 160 and the UE 102. For example, in a case that the one or more sets of the second parameters included in the third information and the one or more sets of the second parameters included in the fourth information are not configured, and in a case that the UE 102 detects the PDCCH for the DCI format 0_2 (e.g., in a common search space associated with the CORESET 0 and/or not associated with the CORESET 0, in a UE-specific search space), the default values of the second parameter(s) may be used (e.g., applied for the PUSCH transmission).

In yet another design, a new DCI format may not be introduced, but modifications and/or enhancements of current DCI format(s) may be used to schedule PUSCH for enhanced URLLC or other services in future releases. Reinterpretation of field(s) in current DCI format (e.g., DCI format 0_0 or DCI format 0_1) may be applied to provide necessary information to schedule PUSCH for enhanced URLLC or other services in future releases.

Bit(s) or part of bits of some bit fields (e.g., frequency domain resource assignment, time domain resource assignment, frequency hopping flag, modulation and coding scheme, new data indicator, redundancy version, HARQ process number, TPC command for scheduled PUSCH, UL/SUL indicator, etc.) in DCI format 0_0 (or DCI format 0_1) may be reinterpreted as a different bit field(s) (e.g., antenna port(s), transmission configuration indication, SRS request, carrier indicator, CSI request, beta offset indicator, SRS resource indicator, repetition factor, priority indication, etc.) if the reinterpretation is RRC configured, indicated explicitly or implicitly.

For example, if multiple configurations are configured, and DCI format 0_0 (or DCI format 0_1) is used to activate and/or deactivate one or multiple configurations, the bit field HARQ process number (or a new data indicator, redundancy version) may be used to indicate the transmission configuration indication and/or identifier.

If PUSCH prioritization is enabled, configured and/or supported, the bit field HARQ process number (or a new data indicator, redundancy version) in DCI format 0_0 or (DCI format 0_1) may be used to indicate prioritization level of the scheduled PUSCH.

For downlink, to support enhanced URLLC service and/or other services in future releases, similarly, a new DCI format and/or current DCI format with modifications and/or enhancements may be also introduced. The DL DCI may use the same and/or a common structure and/or design as the UL DCI mentioned above, or the DL DCI may be designed separately.

In a design, a new DL DCI format (e.g., DCI format 1_2, specifications may use a different name) may be introduced. DCI format 1_2 may be used for the scheduling of PDSCH in one cell. The following information may be transmitted by means of the DCI format 1_2.

DCI format 1_2 may include an identifier for DCI formats. The value of this field may be set to a predefined and/or defaulted value (e.g., 0 or 1), indicating a new and/or different DCI format (compared to DCI format 1_0 and/or DCI format 1_1) for enhanced URLLC and/or other services.

DCI format 1_2 may include an identifier for UL/DL DCI formats. The value of this field may be set to a predefined and/or defaulted value (e.g., 0 or 1), indicating a DL DCI format.

DCI format 1_2 may include antenna ports. The number of bits in this bit field may be 1-2 bits. The number of bits in this bit field may be determined by higher layer (e.g., RRC configuration, an explicit high layer parameter). The number of bits in this bit field may be determined by the set of antenna ports or the number of antenna ports. The number of bits in this bit field may be determined by DMRS type, rank, codebook and/or any other related high layer parameter(s) and/or table(s). Any of the high layer parameters used to determine the number of bits in this field may be commonly configured for DCI format 1_2 and other DCI formats, or separately configured for DCI format 1_2. In other words, parameter(s) configured for Rel-15 DCI format(s) field size determination may be also used to determine the number of bits in the corresponding bit field for DCI format 1_2, or parameter(s) used to determine the number of bits in the corresponding bit field for DCI format 1_2 may be configured separately.

DCI format 1_2 may include a transmission configuration indication. The number of bits in this bit field may be 0-3 bits. The number of bits in this bit field may be determined by higher layer (e.g., RRC configuration, an explicit high layer parameter). The number of bits in this bit field may be determined by a configured number of multiple transmission configurations. For example, if multiple configurations are not enabled, the number of bits in this field is 0 or this bit field is absent in DCI. If the number of transmission configuration is 8, the number of bits in this field may be 3. If multiple transmission configurations are enabled and/or configured, only DCI format 1_2 may be used to activate and/or deactivate corresponding configuration(s).

DCI format 1_2 may include an SRS request. The number of bits in this bit field may be 0-2 bits. The number of bits in this bit field may be determined by higher layer (e.g., RRC configuration, an explicit high layer parameter). The number of bits in this bit field may be determined by configured carrier(s). The number of bits in this bit field may be determined by a configured and/or predefined table, and/or any other related high layer parameters. Any of the high layer parameters used to determine the number of bits in this field may be commonly configured for DCI format 1_2 and other DCI formats, or separately configured for DCI format 1_2. In other words, parameter(s) and/or table(s) configured for Rel-15 DCI format(s) field size determination may be also used to determine the number of bits in the corresponding bit field for DCI format 1_2, or parameter(s) used to determine the number of bits in the corresponding bit field for DCI format 0_2 may be configured separately.

DCI format 1_2 may include a carrier indication. The number of bits in this bit field may be 0-3 bits. The number of bits in this bit field may be determined by higher layer (e.g., RRC configuration, an explicit high layer parameter). The number of bits in this bit field may be determined by a configured number of carriers. For example, if multiple carriers are not enabled and/or configured, the number of bits in this field is 0 or this bit field is absent in DCI. If the number of carriers is larger than 4, the number of bits in this field may be 3. Any of the high layer parameters used to determine the number of bits in this field may be commonly configured for DCI format 1_2 and other DCI formats, or separately configured for DCI format 1_2. In other words, parameter(s) and/or table(s) configured for Rel-15 DCI format(s) field size determination may be also used to determine the number of bits in the corresponding bit field for DCI format 1_2, or parameter(s) used to determine the number of bits in the corresponding bit field for DCI format 1_2 may be configured separately.

DCI format 1_2 may include a repetition factor. The number of bits in this bit field may be 0-2 bits. The number of bits in this bit field may be determined by higher layer (e.g., RRC configuration, an explicit high layer parameter). The number of bits in this bit field may be determined by a configured and/or predefined set of repetition factors. For example, if dynamic indication of repetition factor is not enabled, configured and/or supported, the number of bits in this field is 0 or this bit field is absent in DCI. If dynamic indication of repetition factor is enabled, configured and/or supported, and/or the number of repetition factors in the configured and/or predefined set is 4 (e.g., {1, 2, 4, 8}), the number of bits in this field may be 2. Any of the high layer parameters, sets and/or tables used to determine the number of bits in this field may be commonly configured for DCI format 1_2 and other DCI formats, or separately configured for DCI format 1_2. In other words, parameter(s), table(s) and/or set(s) configured for Rel-15 DCI format(s) field size determination may be also used to determine the number of bits in the corresponding bit field for DCI format 1_2, or parameter(s), table(s) and/or set(s) used to determine the number of bits in the corresponding bit field for DCI format 1_2 may be configured separately.

DCI format 1_2 may include a priority indication. The number of bits in this bit field may be 0-3 bits. The number of bits in this bit field may be determined by higher layer (e.g., RRC configuration, an explicit high layer parameter). The number of bits in this bit field may be determined by a configured and/or predefined set of priority levels and or the number of configured and/or predefined priority levels. For example, if PDSCH prioritization is not enabled, configured and/or supported, the number of bits in this field is 0 or this bit field is absent in DCI. If the number of configured and/or predefined PDSCH priority levels is 4 (e.g., {1, 2, 4, 8}), the number of bits in this field may be 2. Any of the high layer parameters, sets and/or tables used to determine the number of bits in this field may be commonly configured for DCI format 1_2 and other DCI formats, or separately configured for DCI format 1_2. In other words, parameter(s), table(s) and/or set(s) configured for Rel-15 DCI format(s) field size determination may be also used to determine the number of bits in the corresponding bit field for DCI format 1_2, or parameter(s), table(s) and/or set(s) used to determine the number of bits in the corresponding bit field for DCI format 1_2 may be configured separately.

DCI format 1_2 may include a rate matching indicator. The number of bits in this bit field may be 0-2 bits. The number of bits in this bit field may be determined by higher layer (e.g., RRC configuration, an explicit high layer parameter). The number of bits in this bit field may be determined by configured rate matching pattern group(s) and/or any related high layer parameters. Any of the high layer parameters, sets and/or tables used to determine the number of bits in this field may be commonly configured for DCI format 1_2 and other DCI formats, or separately configured for DCI format 1_2. In other words, parameter(s), table(s) and/or set(s) configured for Rel-15 DCI format(s) field size determination may be also used to determine the number of bits in the corresponding bit field for DCI format 1_2, or parameter(s), table(s) and/or set(s) used to determine the number of bits in the corresponding bit field for DCI format 1_2 may be configured separately.

DCI format 1_2 may include a PRB bundling size indicator. The number of bits in this bit field may be 0-1 bits. The number of bits in this bit field may be determined by higher layer (e.g., RRC configuration, an explicit high layer parameter). The number of bits in this bit field may be determined by configured PRB bundling type (e.g., whether PRB bundling is configured or not, whether PRB bundling type is configured as static or dynamic). If PRB bundling is not configured or is set as static, the number of bits in this field is 0 or this bit field is absent in DCI. Any of the high layer parameters, sets and/or tables used to determine the number of bits in this field may be commonly configured for DCI format 1_2 and other DCI formats, or separately configured for DCI format 1_2. In other words, parameter(s), table(s) and/or set(s) configured for Rel-15 DCI format(s) field size determination may be also used to determine the number of bits in the corresponding bit field for DCI format 1_2, or parameter(s), table(s) and/or set(s) used to determine the number of bits in the corresponding bit field for DCI format 1_2 may be configured separately.

DCI format 1_2 may include ZP CSI-RS triggering. The number of bits in this bit field may be 0-2 bits. The number of bits in this bit field may be determined by higher layer (e.g., RRC configuration, an explicit high layer parameter). The number of bits in this bit field may be determined by the number of ZP CSI-RS resource sets configured in the higher layer configuration and/or any other related high layer parameters. Any of the high layer parameters used to determine the number of bits in this field may be commonly configured for DCI format 1_2 and other DCI formats, or separately configured for DCI format 1_2. In other words, parameter(s) configured for Rel-15 DCI format(s) field size determination may be also used to determine the number of bits in the corresponding bit field for DCI format 1_2, or parameter(s) used to determine the number of bits in the corresponding bit field for DCI format 1_2 may be configured separately.

DCI format 1_2 may include a time domain resource assignment. The number of bits in this bit field may be 0-6 bits. The number of bits in this bit field may be determined by higher layer (e.g., RRC configuration, an explicit high layer parameter). The number of bits in this bit field may be determined by the number of entries in the time domain resource assignment table configured by high layer (e.g., RRC configuration) or a defaulted time domain resource assignment table. Any of the high layer parameters (e.g., configured time domain resource assignment table, defaulted and/or predefined time domain resource assignment table) used to determine the number of bits in this field may be commonly configured for DCI format 1_2 and other DCI formats, or separately configured for DCI format 1_2.

In other words, parameter(s) (e.g., time domain resource assignment table configured by high layer) configured for Rel-15 DCI format(s) field size determination may be also applied to the corresponding bit field for DCI format 1_2, or parameter(s) and/or table(s) used to determine the number of bits in the corresponding bit field for DCI format 1_2 may be configured separately.

For example, first parameters (e.g., PDSCH-TimeDomainResourceAllocation) are used for configuring a time domain relation between the PDCCH (e.g., the DCI format 1_0, the DCI format 1_1, and/or the DCI format 1_2) and the PDSCH (e.g., the PDSCH transmission). For example, the first parameters may include information indicating an offset (e.g., a slot offset) to be applied for the PDSCH transmission. Also, the first parameters may include information indicating an index giving valid combinations of start symbol and length (also referred as to start and length indicator (SLIV)) to be applied for the PDSCH transmission. Also, the first parameters may include information indicating PDSCH mapping type to be applied for the PDSCH transmission.

Here, the gNB 160 may transmit, by using the RRC message, one or more sets of the first parameters (e.g., PDSCH-TimeDomainResourceAllocationList). And, the gNB 160 may indicate, by using a value (e.g., a value "m") of the time domain resource assignment field, one set of the first parameters among from the one or more sets of the first parameters. Namely, the gNB 160 may indicate, by using the value of the time domain resource assignment field, which of the configured first parameters the UE 102 apply for the PDSCH transmission.

Namely, in a case that the UE 102 detects the DCI format 1_0 and/or the DCI format 1_1 and/or the DCI format 1_2, the offset (e.g., the slot offset), the index for the start symbol and the length, and/or the PDSCH mapping type may be determined based on a value of time domain resource assignment field included in the DCI format 1_0 and/or the DCI format 1_1 and/or the DCI format 1_2. For example, the value (e.g., the value "m") of the time domain resource assignment field may be used for indicating a row index (e.g., a row index "m+1") of a first resource allocation table, and the first resource allocation table may be used for defining the one or more sets of the first parameters (e.g., the offset (e.g., the slot offset), the index for the start symbol and the length, and/or the PDSCH mapping type). Namely, the indexed row of the first resource allocation table may be used for defining the one or more sets of the first parameters (e.g., the offset (e.g., the slot offset), the index for the start symbol and the length, and/or the PDSCH mapping type). Here, the one or more sets of the first parameters (e.g., the offset (e.g., the slot offset), the index for the start symbol and the length, and/or the PDSCH mapping type) may be applied for the PDSCH transmission scheduled by using the DCI format 1_0 and/or the DCI format 1_1 and/or the DCI format 1_2.

Also, the number of bits (e.g., a size, and/or a bit width) of the time domain resource assignment field (e.g., a DCI field) may be determined based on the number of entries in the first resource allocation table (i.e., the number of entries in the PDSCH-TimeDomainResourceAllocationList). For example, the maximum number of the first allocation table (i.e., the maximum number of the first parameters (i.e., the PDSCH-TimeDomainResourceAllocation) in the PDSCH-TimeDomainResourceAllocationList) may be a first value (e.g., 16). Namely, the maximum number of bits of the time domain resource assignment field included in the DCI format 1_0 and/or the DCI format 1_1 and/or the DCI format 1_2 may be 4 bits (i.e., corresponding to the first value). For example, in a case that 5 sets of the first parameters (i.e., 5 entries of the first resource allocation table) are configured, the UE 102 may consider the number of bits of the time domain resource assignment field included in the DCI format 1_0 and/or the DCI format 1_1 and/or the DCI format 1_2 are 3 bits. Also, for example, in a case that 14 sets of the first parameters (i.e., 14 entries of the first resource allocation table) are configured, the UE 102 may consider the number of bits of the time domain resource assignment field included in the DCI format 1_0 and/or the DCI format 1_1 and/or the DCI format 1_2 are 4 bits.

Here, the one or more sets of the first parameters (e.g., PDSCH-TimeDomainResourceAllocationList) may be included in third information (e.g., PDSCH-ConfigCommon). For example, the third information may be used for configuring a cell specific PDSCH parameter(s). For example, system information (e.g., system information block 1) may include the third information. Also, the one or more sets of the first parameters (e.g., PDSCH-TimeDomainResourceAllocationList) may be included in fourth information (e.g., PDSCH-Config). For example, the fourth information may be used for configuring a UE specific parameter(s). For example, the dedicated RRC message may include the fourth information. For example, first sets of values of the first parameters may be included in the third information, and second sets of values of the first parameters may be included in the fourth information.

And, in a case that the UE 102 detects the PDCCH for the DCI format 1_0 and/or the DCI format 1_1 and/or the DCI format 1_2 in a common search space(s) (e.g., a common search space set(s)) associated with the CORESET 0, the one or more sets of the first parameters included in the third information may be used (e.g., applied for the PDSCH transmission). Also, in a case that the UE 102 detects the PDCCH for the DCI format 1_0 and/or the DCI format 1_1 and/or the DCI format 1_2 in a common search space(s) (e.g., a common search space set(s)) not associated with the CORESET 0, the one or more sets of the first parameters included in the fourth information may be used (e.g., applied for the PDSCH transmission). Also, in a case that the UE 102 detects the PDCCH for the DCI format 1_0 and/or the DCI format 1_1 and/or the DCI format 1_2 in a UE-specific search space(s) (e.g., a UE-specific search space set(s)), the one or more sets of the first parameter(s) included in the fourth information may be used (e.g., applied for the PDSCH transmission).

Also, in a case that the one or more sets of the first parameters included in the third information and the one or more sets of the first parameters included in the fourth information are not configured, a default value(s) of the first parameter(s) (e.g., a default time domain resource assignment(s)) may be used (e.g., applied for the PDSCH transmission). Here, the default value(s) of the first parameter(s) may be defined, in advance, by the specification and known information between the gNB 160 and the UE 102. For example, in a case that the one or more sets of the first parameters included in the third information and the one or more sets of the second parameters included in the fourth information are not configured, and in a case that the UE 102 detects the PDCCH for the DCI format 1_0 and/or the DCI format 1_1 and/or the DCI format 1_2 (e.g., in a common search space associated with the CORESET 0 and/or not associated with the CORESET 0, in a UE-specific search space), the default values of the first parameter(s) may be used (e.g., applied for the PDSCH transmission).

Also, second parameters (e.g., PDSCH-TimeDomainResourceAllocation2) are used for configuring a time domain relation between the PDCCH (e.g., the DCI format 0_2) and the PDSCH (e.g., the PDSCH transmission). For example, the second parameters may include information indicating an offset (e.g., a slot offset and/or a symbol offset) to be applied for the PDSCH transmission. Also, the second parameters may include information indicating an index giving valid combinations of start symbol and length (also referred as to start and length indicator (SLIV)) to be applied for the PDSCH transmission. Also, the second parameters may include information indicating PDSCH mapping type to be applied for the PDSCH transmission.

Here, the gNB 160 may transmit, by using the RRC message, one or more sets of the second parameters (e.g., PDSCH-TimeDomainResourceAllocationList2). And, the gNB 160 may indicate, by using a value (e.g., a value "m") of the time domain resource assignment field, one set of the first parameters among from the one or more sets of the first parameters. Namely, the gNB 160 may indicate, by using the value of the time domain resource assignment field, which of the configured first parameters the UE 102 apply for the PDSCH transmission.

Namely, in a case that the UE 102 detects the DCI format 1_2, the offset (e.g., the slot offset and/or the symbol offset), the index for the start symbol and the length, and/or the PDSCH mapping type may be determined based on a value of time domain resource assignment field included in the DCI format 1_2. For example, the value (e.g., the value "m") of the time domain resource assignment field may be used for indicating a row index (e.g., a row index "m+1") of a second resource allocation table, and the second resource allocation table may be used for defining the one or more sets of the second parameters (e.g., the offset (e.g., the slot offset and/or the symbol offset), the index for the start symbol and the length, and/or the PDSCH mapping type). Namely, the indexed row of the second resource allocation table may be used for defining the one or more sets of the second parameters (e.g., the offset (e.g., the slot offset and/or the symbol offset), the index for the start symbol and the length, and/or the PDSCH mapping type). Here, the one or more sets of the second parameters (e.g., the offset (e.g., the slot offset and/or the symbol offset), the index for the start symbol and the length, and/or the PDSCH mapping type) may be applied for the PDSCH transmission scheduled by using the DCI format 1_2.

Also, the number of bits (e.g., a size, and/or a bit width) of the time domain resource assignment field (e.g., a DCI field) may be determined based on the number of entries in the second resource allocation table (i.e., the number of entries in the PDSCH-TimeDomainResourceAllocationList2). For example, the maximum number of the second allocation table (i.e., the maximum number of the second parameters (i.e., the PDSCH-TimeDomainResourceAllocation2) in the PDSCH-TimeDomainResourceAllocationList2) may be a second value (e.g., 64). Namely, the maximum number of bits of the time domain resource assignment field included in the DCI format 1_2 may be 6 bits (i.e., corresponding to the first value). For example, in a case that 5 sets of the second parameters (i.e., 5 entries of the second resource allocation table) are configured, the UE 102 may consider the number of bits of the time domain resource assignment field included in the DCI format 1_2 are 3 bits. Also, for example, in a case that 50 sets of the second parameters (i.e., 50 entries of the second resource allocation table) are configured, the UE 102 may consider the number of bits of the time domain resource assignment field included in the DCI format 1_2 are 6 bits.

Here, the number of bits of the time domain resource assignment field may be fixed (e.g., 5 bits). Namely, the UE 102 may consider the number of bits of the time domain resource assignment field is always fixed (e.g., 5 bits). Namely, the number of entries in the second resource allocation table may be fixed (e.g., 32 entries corresponding to 5 bits). For example, in a case that the number of entries in the second resource allocation is fixed (e.g., in a case that the number of bits of the time domain resource assignment field is fixed), the one or more sets of the second parameters may be defined, in advance, by the specification. Also, in a case that the number of entries in the second resource allocation is fixed (e.g., in a case that the number of bits of the time domain resource assignment field is fixed), the gNB 160 may always configure a fixed number of sets of the second parameters (e.g., a fixed number (e.g., 32) of the PDSCH-TimeDomainResourceAllocation2) in the PDSCH-TimeDomainResourceAllocationList2.

Here, the one or more sets of the second parameters (e.g., PDSCH-TimeDomainResourceAllocationList2) may be included in third information (e.g., PDSCH-ConfigCommon). Also, the one or more sets of the second parameters (e.g., PDSCH-TimeDomainResourceAllocationList2) may be included in fourth information (e.g., PDSCH-Config). For example, first sets of values of the second parameters may be included in the third information, and second sets of values of the second parameters may be included in the fourth information.

And, in a case that the UE 102 detects the PDCCH for the DCI format 1_2 in a common search space(s) associated with the CORESET 0, the one or more sets of the second parameters included in the third information may be used (e.g., applied for the PDSCH transmission). Also, in a case that the UE 102 detects the PDCCH for the DCI format 1_2 in a common search space(s) not associated with the CORESET 0, the one or more sets of the second parameters included in the fourth information may be used (e.g., applied for the PDSCH transmission). Also, in a case that the UE 102 detects the PDCCH for the DCI format 1_2 in a UE-specific search space(s), the one or more sets of the second parameter(s) included in the fourth information may be used (e.g., applied for the PDSCH transmission).

Also, in a case that the one or more sets of the second parameters included in the third information and the one or more sets of the second parameters included in the fourth information are not configured, a default value(s) of the second parameter(s) (e.g., a default time domain resource assignment(s)) may be used (e.g., applied for the PDSCH transmission). Here, the default value(s) of the second parameter(s) may be defined, in advance, by the specification and known information between the gNB 160 and the UE 102. For example, in a case that the one or more sets of the second parameters included in the third information and the one or more sets of the second parameters included in the fourth information are not configured, and in a case that the UE 102 detects the PDCCH for the DCI format 1_2 (e.g., in a common search space associated with the CORESET 0 and/or not associated with the CORESET 0, in a UE-specific search space), the default values of the second parameter(s) may be used (e.g., applied for the PDSCH transmission).

In yet another design, a new DL DCI format may not be introduced, but modifications and/or enhancements of current DCI format(s) may be needed to schedule PDSCH for enhanced URLLC or other services in future releases. Reinterpretation of field(s) in current DCI format (e.g., DCI format 1_0 or DCI format 1_1) may be applied to provide necessary information to schedule PDSCH for enhanced URLLC or other services in future releases.

Bit(s) or part of bits of some bit fields (e.g., frequency domain resource assignment, time domain resource assignment, VRB-to-PRB mapping, modulation and coding scheme, new data indicator, redundancy version, HARQ process number, downlink assignment index, TPC command for scheduled PUCCH, PUCCH resource indicator, PDSCH-to-HARQ_feedback timing indicator, etc.) in DCI format 1_0 (or DCI format 1_1) may be reinterpreted as a different bit field(s) (e.g., antenna port(s), transmission configuration indication, PRB bundling size indicator, carrier indicator, rate matching indicator, ZP CSI-RS trigger, SRS request, repetition factor, priority indication, etc.) if the reinterpretation is RRC configured, indicated explicitly or implicitly.

For example, if multiple configurations are configured, and DCI format 1_0 or (DCI format 1_1) is used to activate and/or deactivate one or multiple configurations, the bit field HARQ process number (or new data indicator, redundancy version) may be used to indicate the transmission configuration indication/identifier.

If PDSCH prioritization is enabled, configured and/or supported, the bit field HARQ process number (or new data indicator, redundancy version) in DCI format 1_0 or (DCI format 1_1) may be used to indicate prioritization level of the scheduled PDSCH.

The new DCI format and/or enhanced/modified DCI formats for enhanced URLLC service and/or other services in future releases are referred to as URLLC DCI format herein. Methods to differentiate URLLC DCI format and Rel-15 DCI format are described here. A new RNTI may be used to scramble the CRC of the URLLC DCI format. If parameters for URLLC DCI format are configured and/or the URLLC DCI format size is configured, the UE 102 may monitor URLLC DCI format(s) with CRC scrambled by the new RNTI. In yet another design, explicit DCI field may be used for differentiation (e.g., if the parameter(s) for the DCI format size is configured, the UE 102 monitors URLLC DCI format(s) that includes 1-bit information (i.e., the UE 102 assumes that 1-bit information is present in URLLC DCI format(s)). In yet another design, URLLC DCI format and Rel-15 DCI format may be monitored in different search spaces.

The parameter(s) mentioned above for configuring DCI format size may be configured per serving cell, per DL BWP, per CORESET, and/or per search space. For example, if the parameter(s) is configured for a first DL BWP, the UE 102 monitors PDCCH for configurable DCI format(s) on the first DL BWP (i.e., if the parameter(s) is not configured for a second DL BWP, the UE 102 does not monitor PDCCH for configurable DCI format(s) on the second DL BWP). If the parameter(s) is configured for a first search space, the UE 102 monitors PDCCH for configurable DCI format(s) in the first search space (i.e., if the parameter(s) is not configured for a second search space, the UE does not monitor PDCCH for configurable DCI format(s) on the second search space).

For configuration of DCI format size, only one parameter may be commonly used for configuring the size of all configurable fields. In yet another example, the overall DCI format size may be configured. The presence of each field and/or the size of each field in the DCI format may be derived/determined based on the configured overall DCI format size. In yet another example, separate parameters may be used for configuring the size of each configurable field.

Only one parameter may be commonly used for configuring DL DCI format size and UL DCI format size, or only one parameter may be commonly used for configuring the size of a specific DCI field in both DL DCI format UL DCI format. In yet another example, separate parameters are used for configuring DL DCI format size and UL DCI format size, or separate parameters are used for configuring the sizes of each specific DCI field in DL DCI format and UL DCI format respectively.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154.

For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for a configurable downlink control information (DCI) format as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
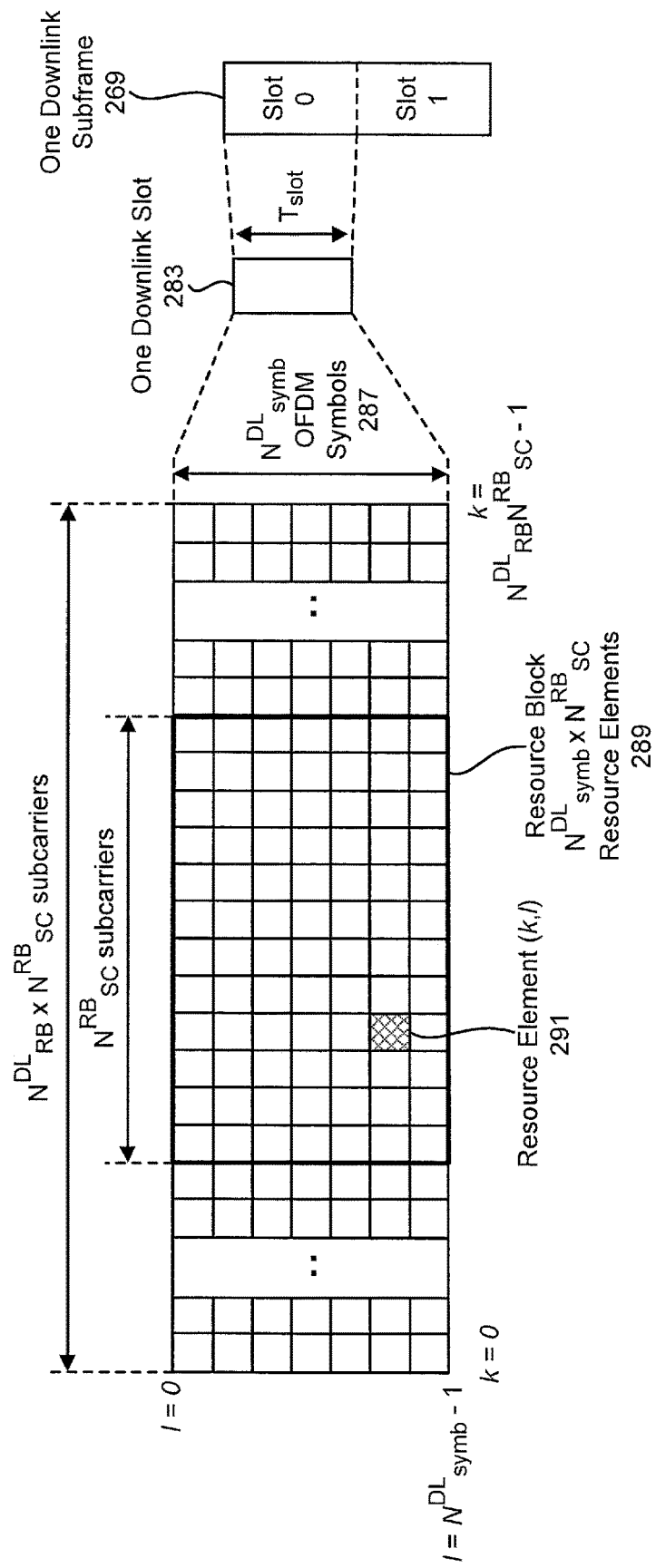
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
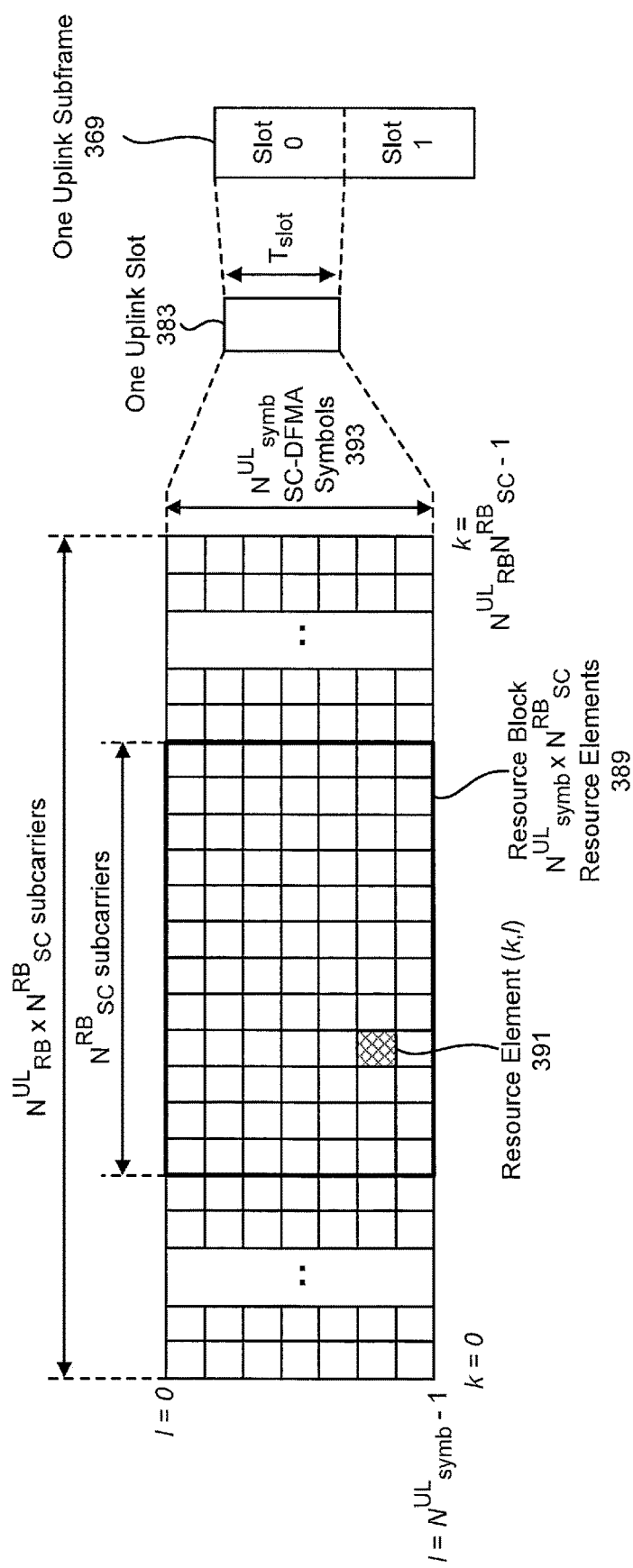
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM and/or DFT-S-OFDM symbols in time domain. A region defined by one sub-carrier in the frequency domain and one OFDM and/or DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
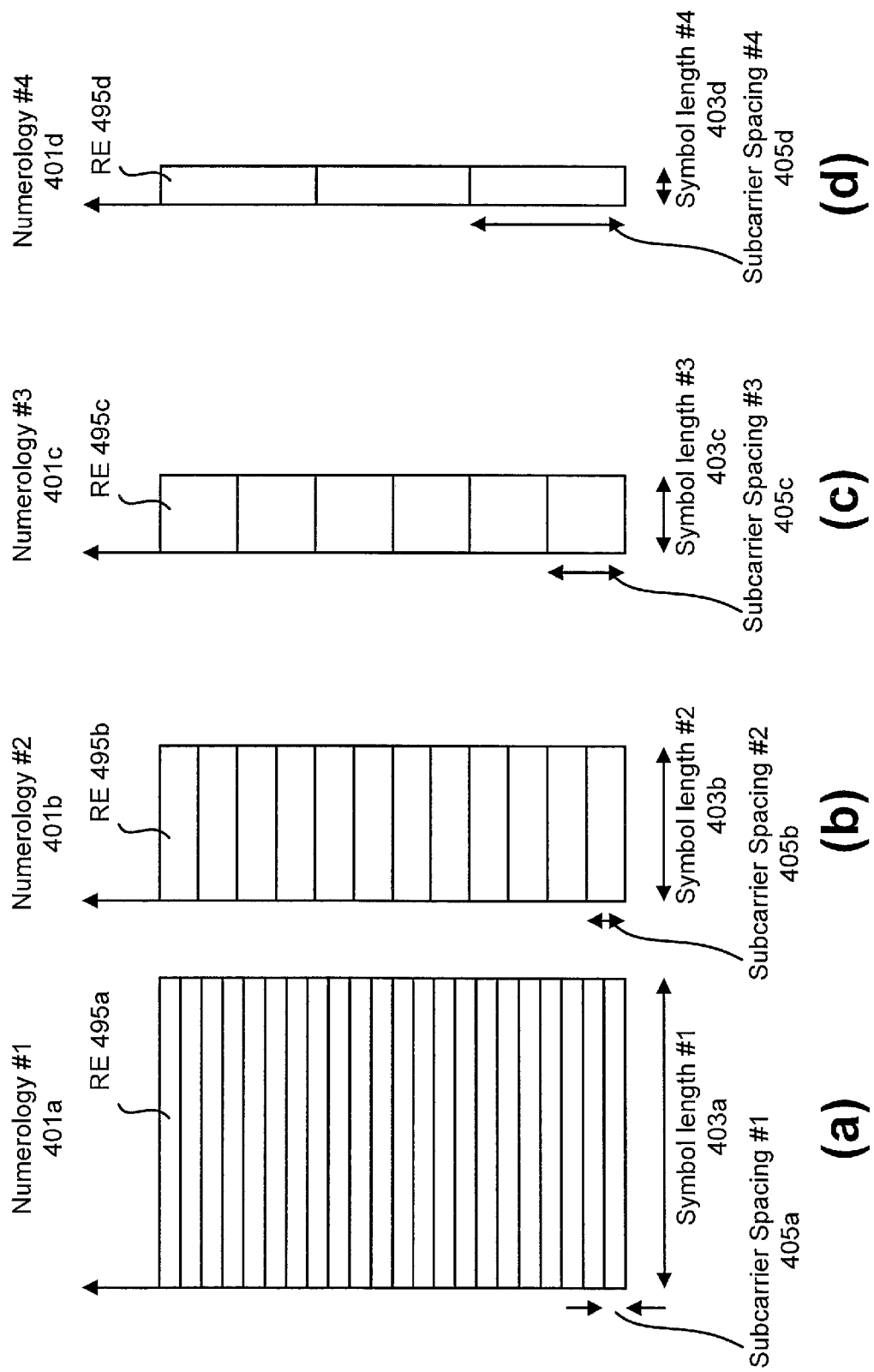
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
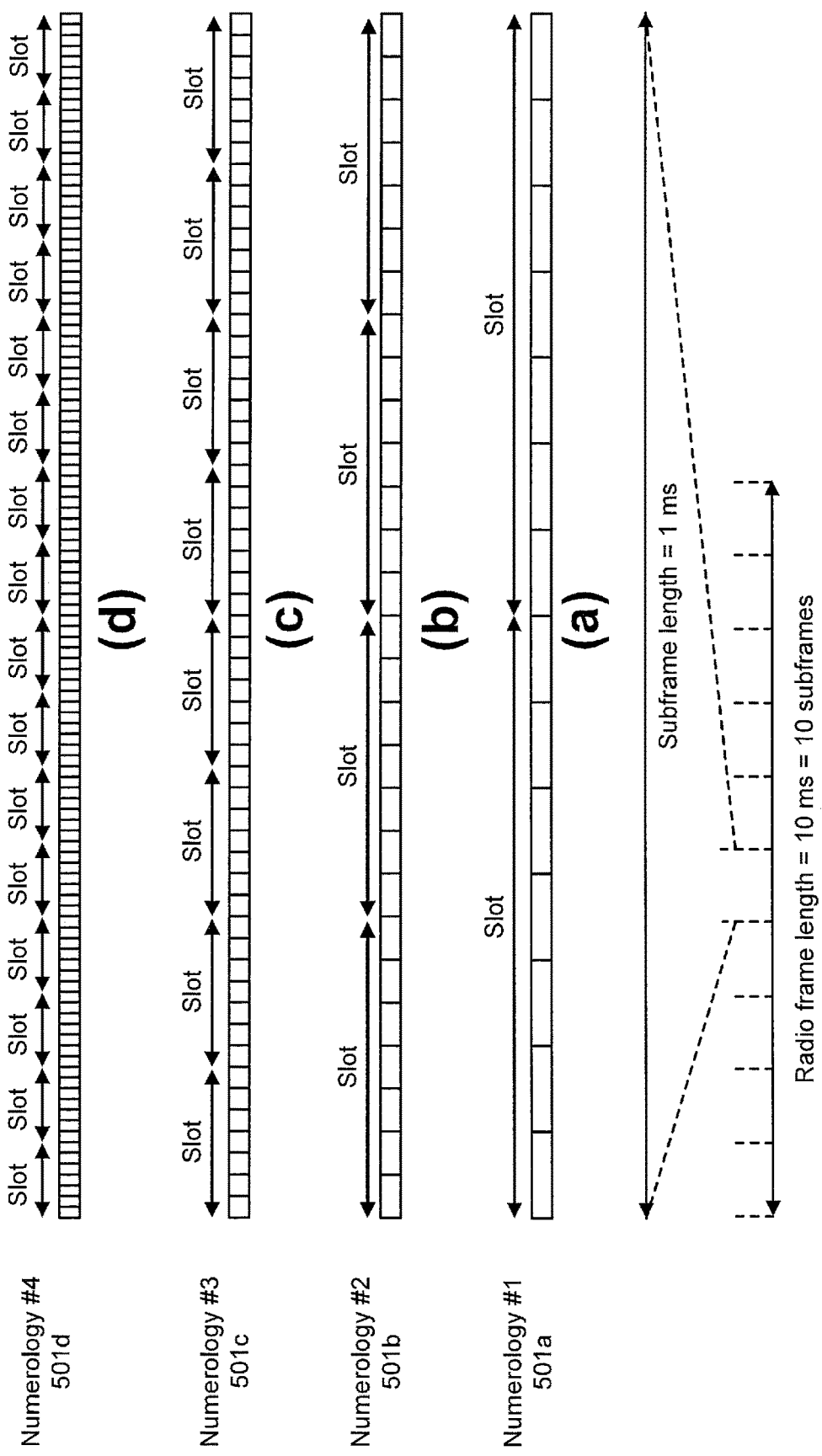
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
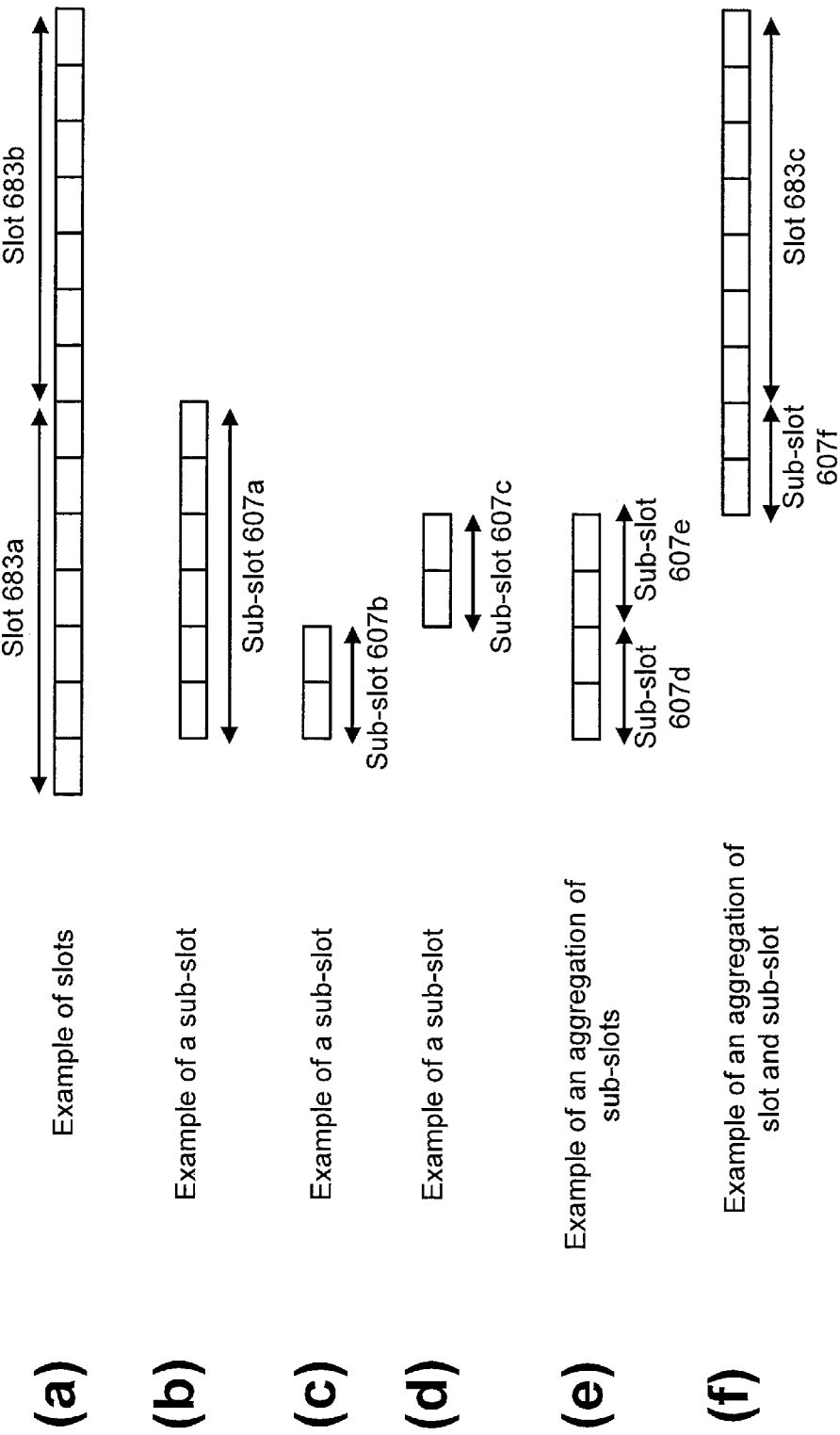
FIG. 6 shows examples of slots and sub-slots.

FIG. 6 shows examples of slots 683 and sub-slots 607. If a sub-slot 607 is not configured by higher layer, the UE 102 and the eNB and/or gNB 160 may only use a slot 683 as a scheduling unit. More specifically, a given transport block may be allocated to a slot 683. If the sub-slot 607 is configured by higher layer, the UE 102 and the eNB and/or gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
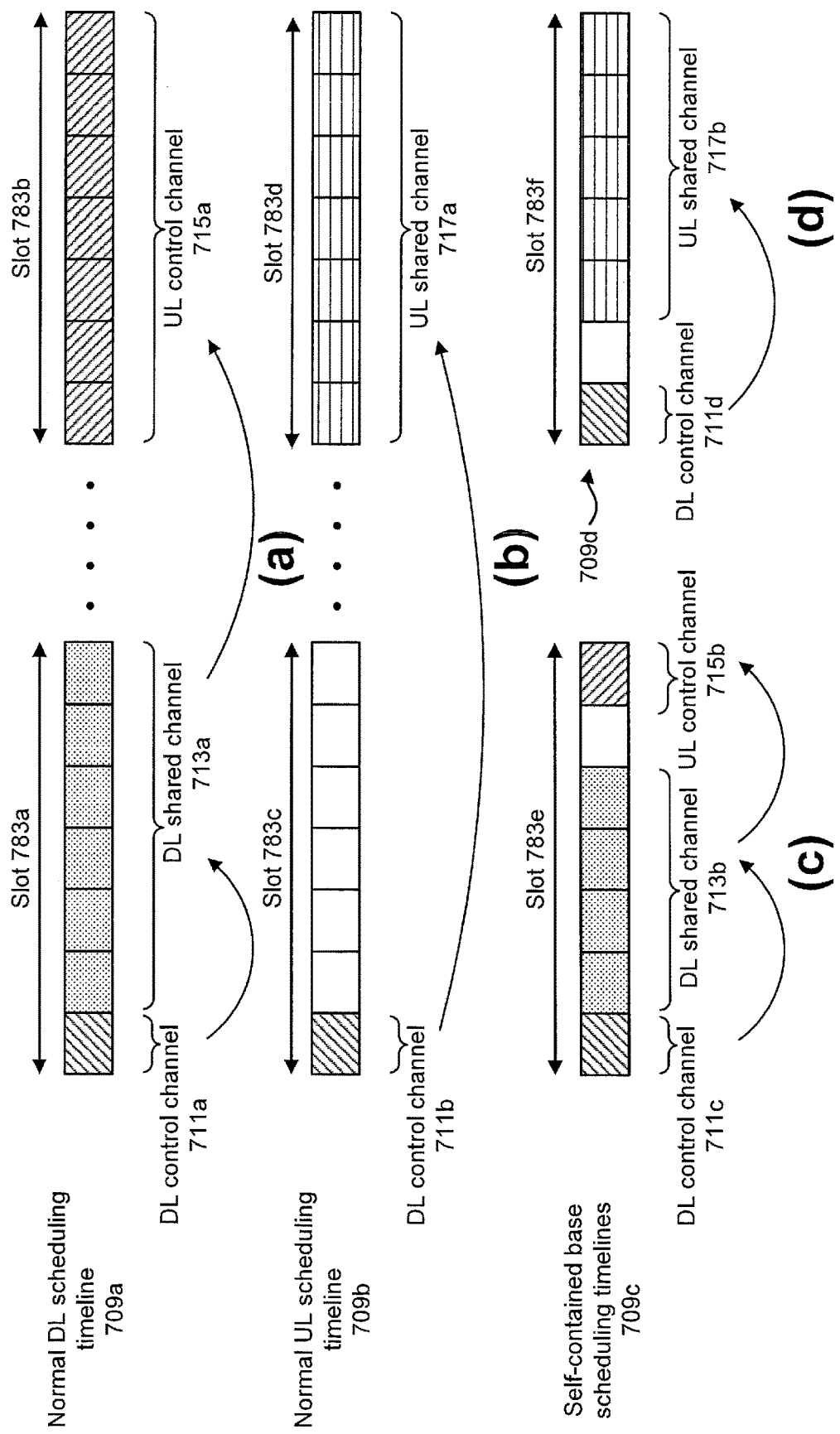
FIG. 7 shows examples of scheduling timelines.

FIG. 7 shows examples of scheduling timelines 709. For a normal DL scheduling timeline 709a, DL control channels are mapped to the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
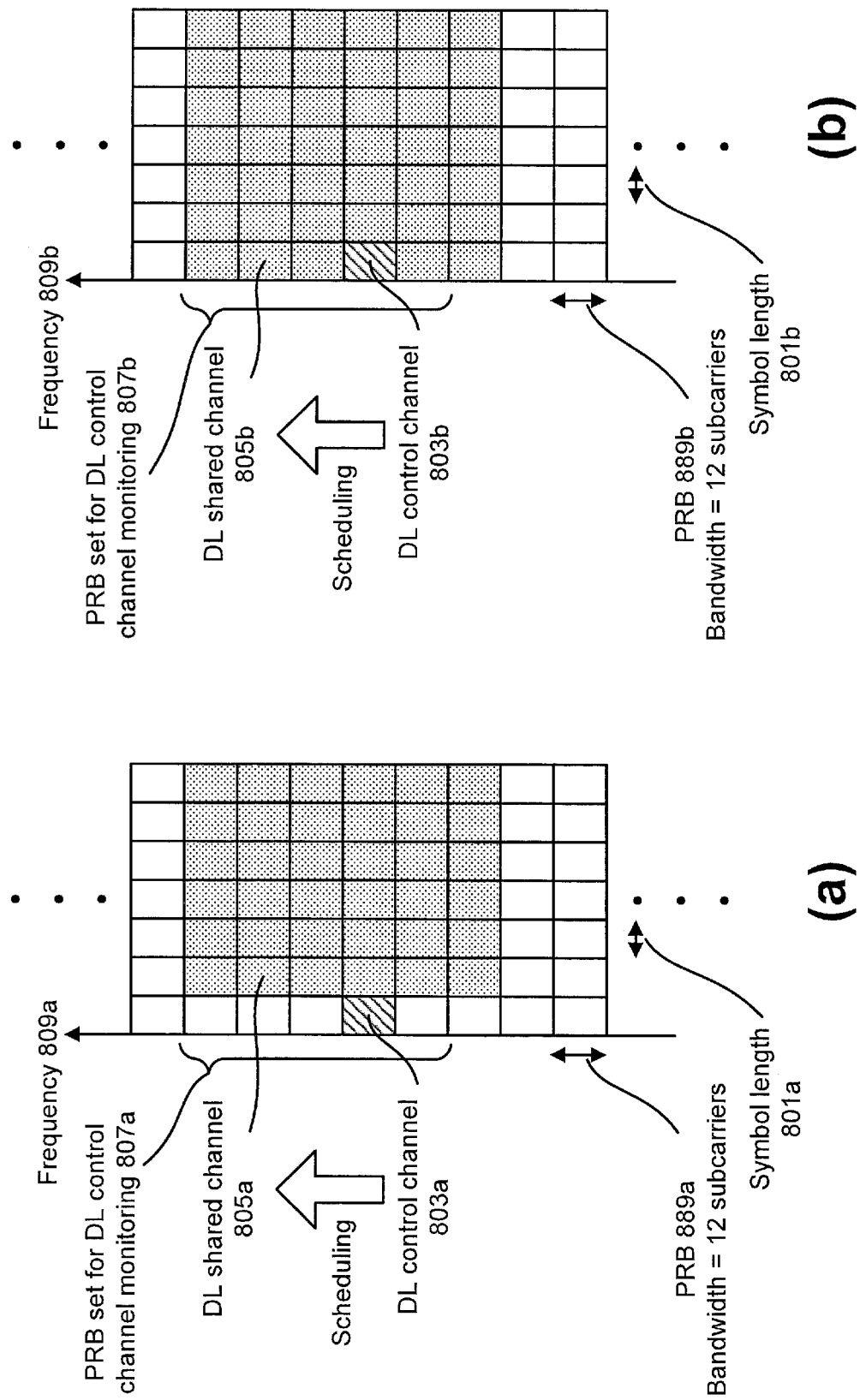
FIG. 8 shows examples of DL control channel monitoring regions.

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include De-modulation reference signals (DMRS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
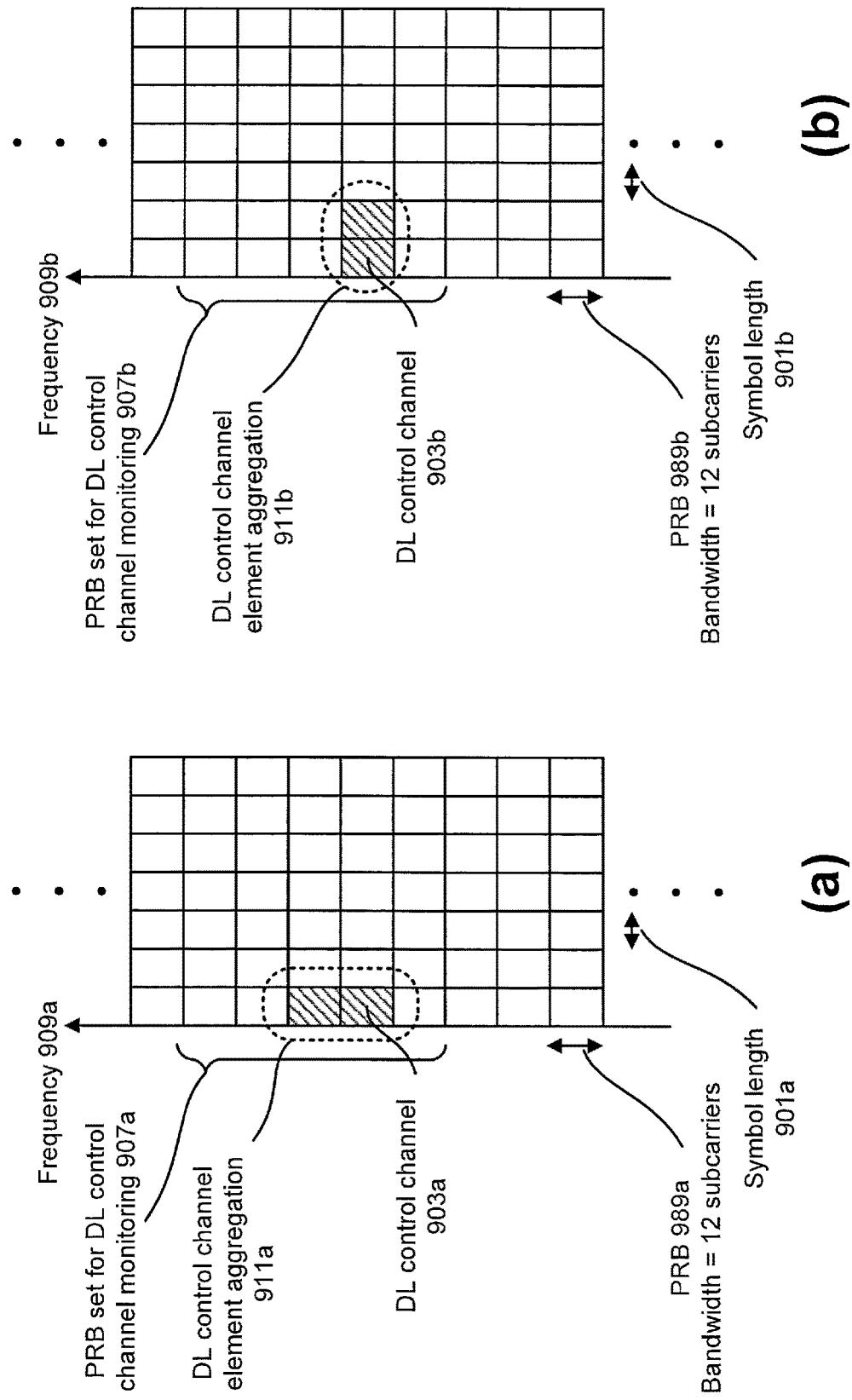
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
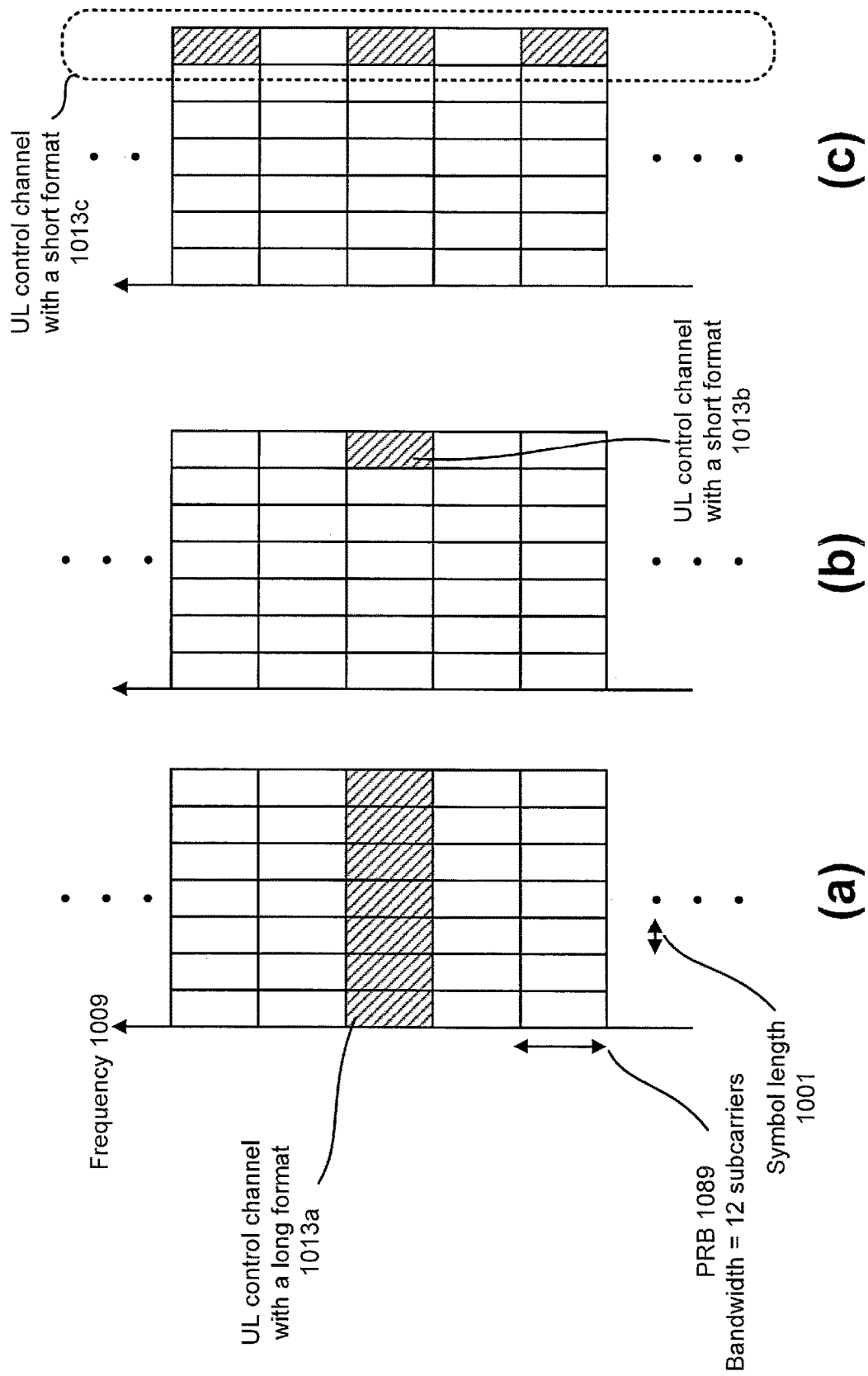
FIG. 10 shows examples of UL control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRB s. For example, interlaced mapping may be applied, namely the UL control channel may be mapped to every N PRBs (e.g., 5 or 10) within a system bandwidth.

Figure 11:
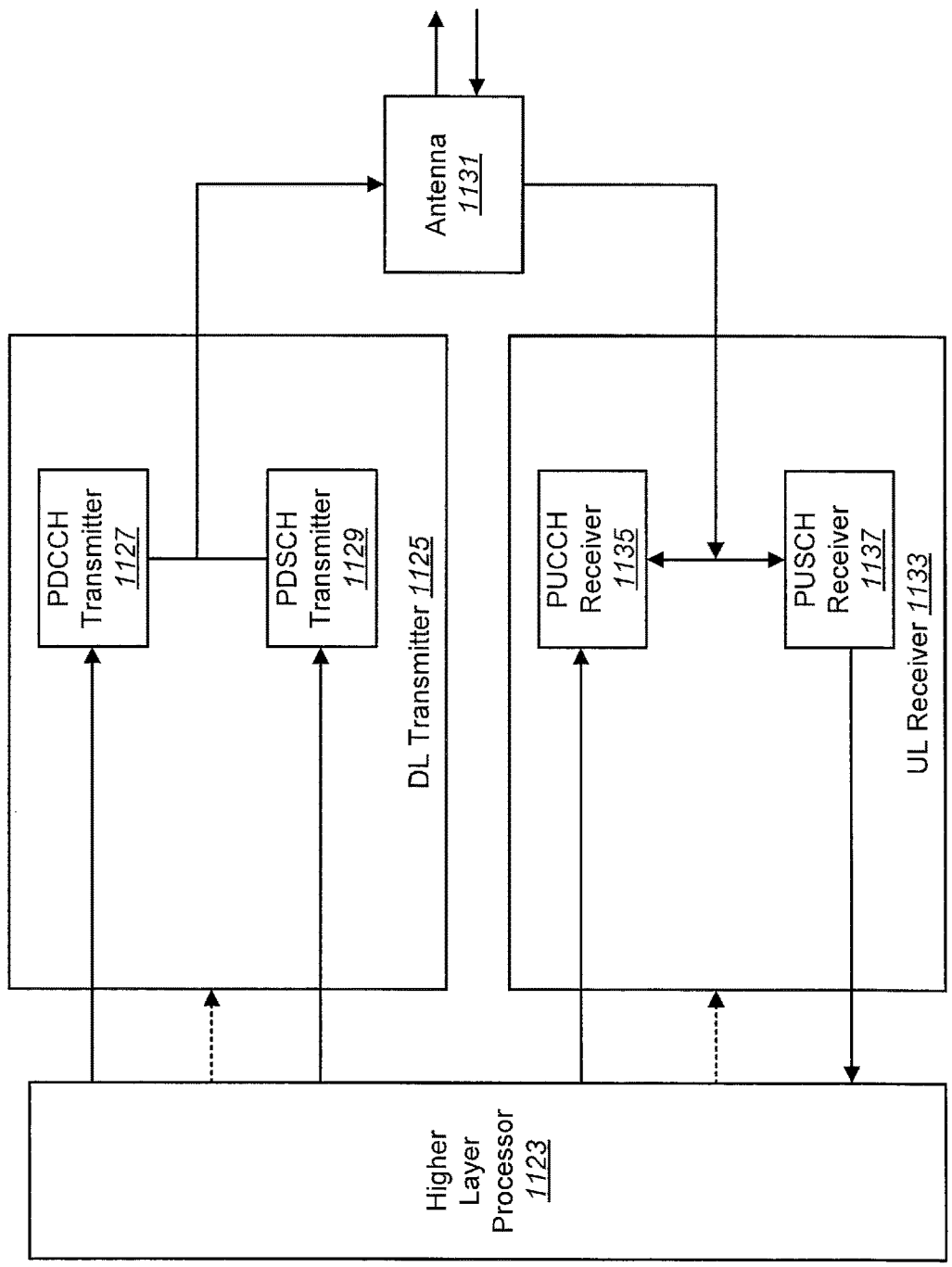
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
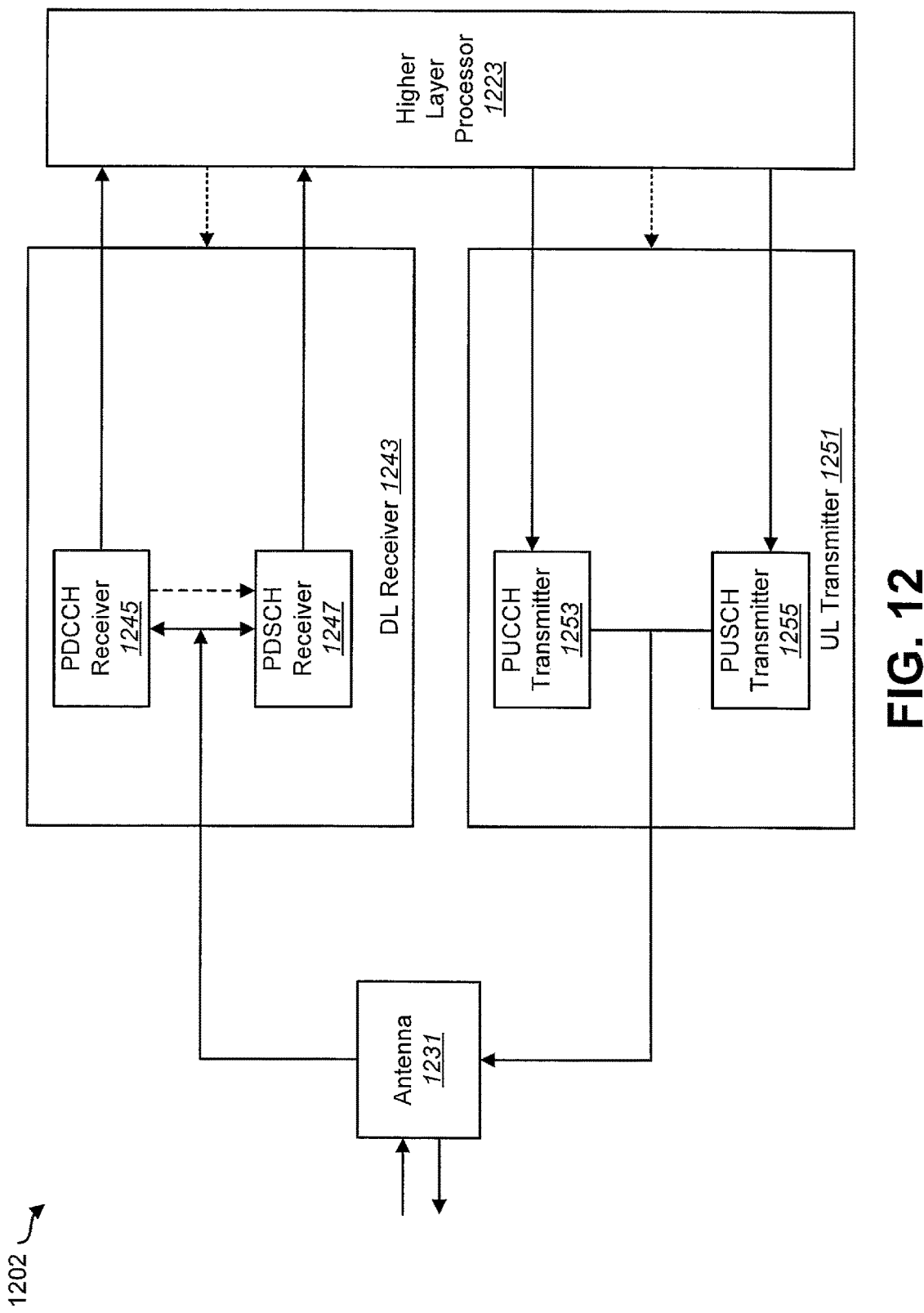
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
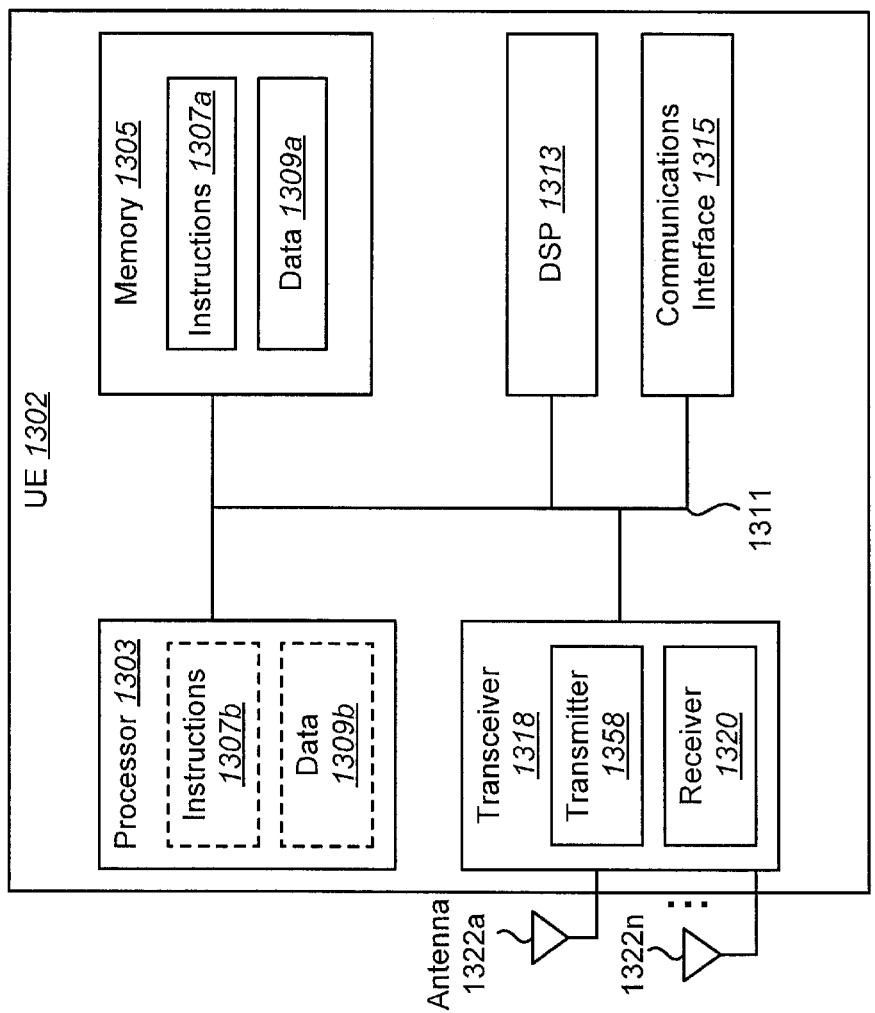
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307*a* and data 1309*a* to the processor 1303. A portion of the memory 1305 may also include non-volatile random-access memory (NVRAM). Instructions 1307*b* and data 1309*b* may also reside in the processor 1303. Instructions 1307*b* and/or data 1309*b* loaded into the processor 1303 may also include instructions 1307*a* and/or data 1309*a* from memory 1305 that were loaded for execution or processing by the processor 1303. The instructions 1307*b* may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
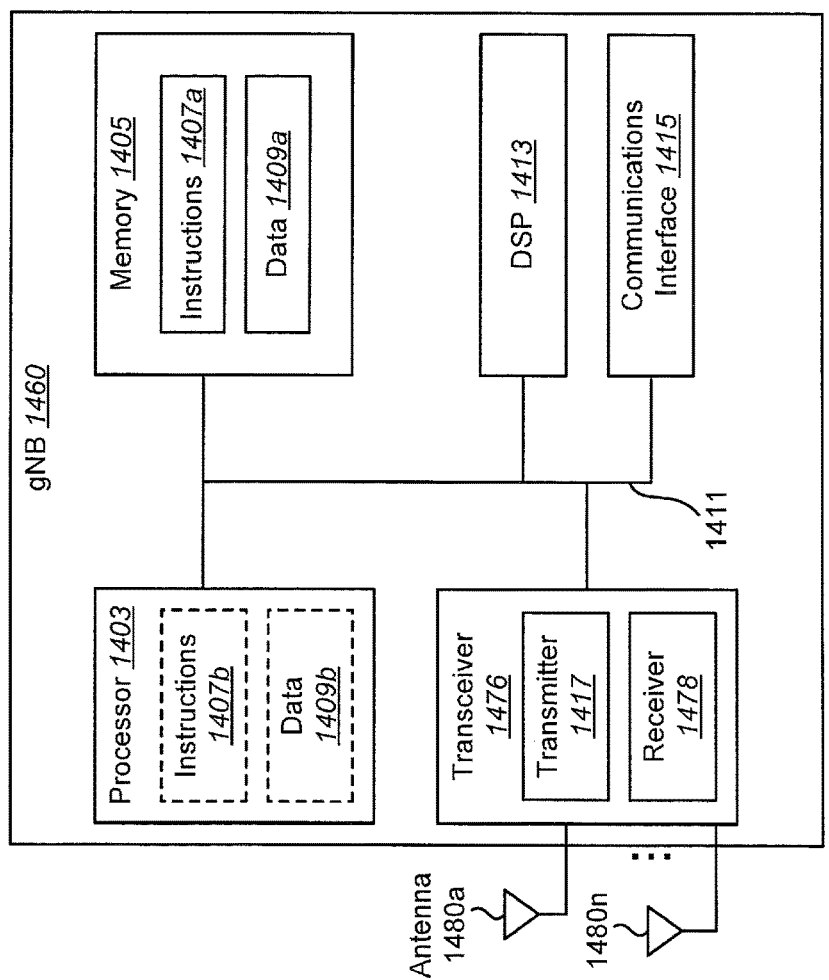
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407*a* and data 1409*a* to the processor 1403. A portion of the memory 1405 may also include non-volatile random-access memory (NVRAM). Instructions 1407*b* and data 1409*b* may also reside in the processor 1403. Instructions 1407*b* and/or data 1409*b* loaded into the processor 1403 may also include instructions 1407*a* and/or data 1409*a* from memory 1405 that were loaded for execution or processing by the processor 1403. The instructions 1407*b* may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
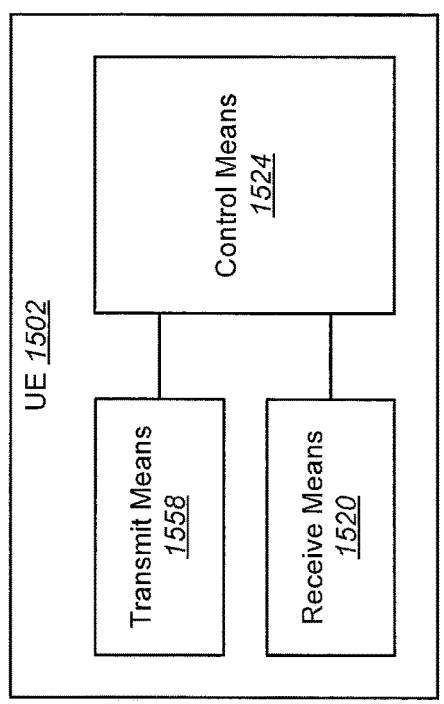
FIG. 15 is a block diagram illustrating one implementation of a UE in which the systems and methods described herein may be implemented.

FIG. 15 is a block diagram illustrating one implementation of a UE 1502 in which the systems and methods described herein may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
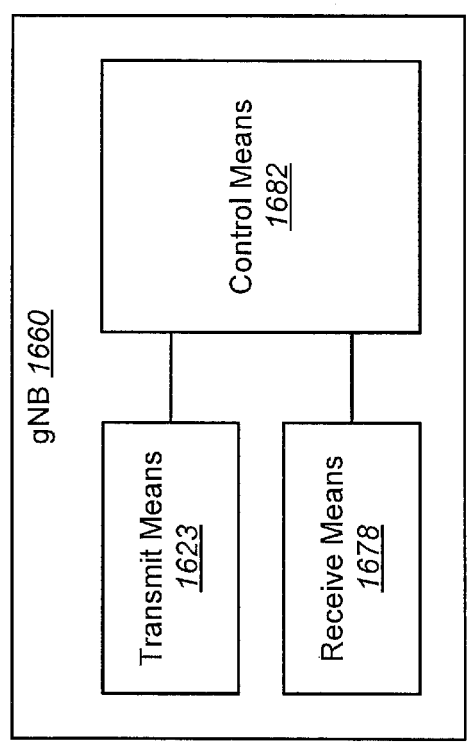
FIG. 16 is a block diagram illustrating one implementation of a gNB in which the systems and methods described herein may be implemented.

FIG. 16 is a block diagram illustrating one implementation of a gNB 1660 in which the systems and methods described herein may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
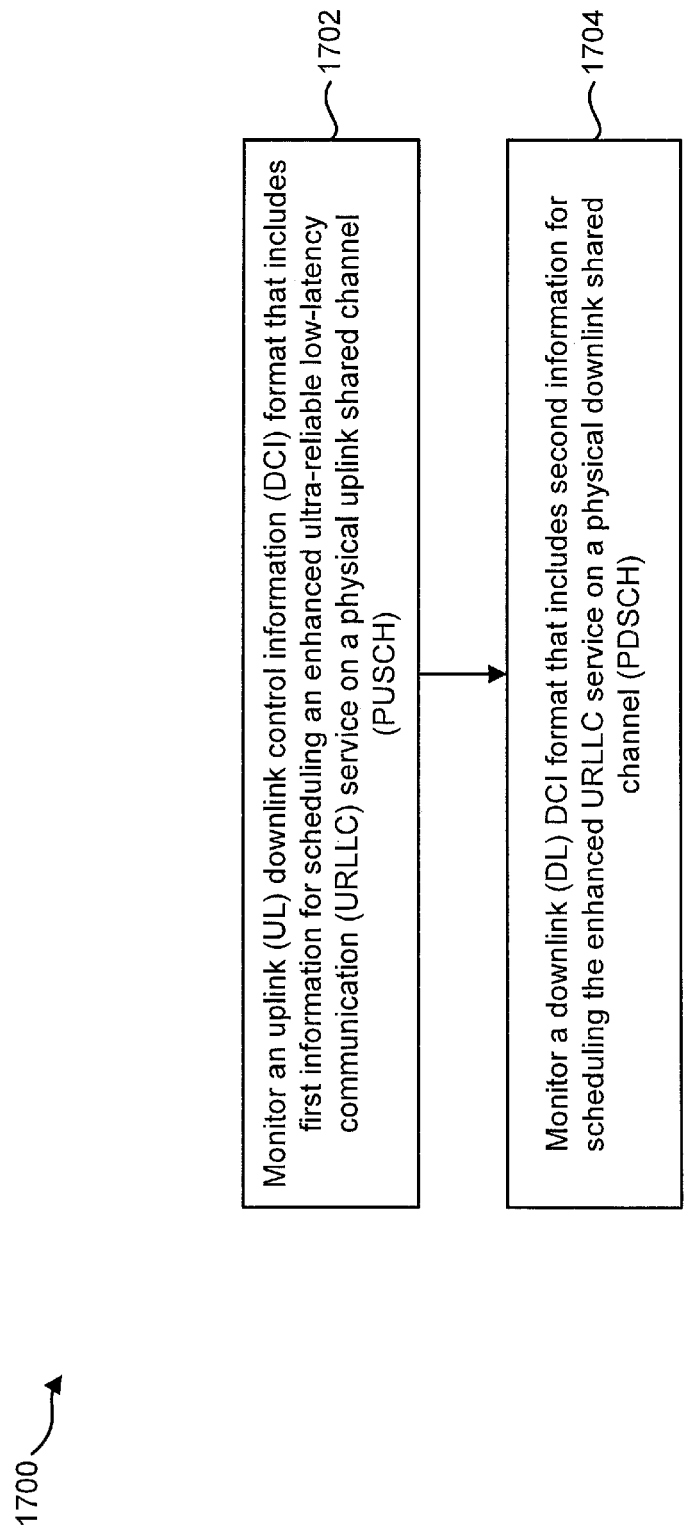
FIG. 17 is a flow diagram illustrating a method by a UE.

FIG. 17 is a flow diagram illustrating a method 1700 by a user equipment (UE) 102. The UE 102 may monitor 1702 an uplink (UL) downlink control information (DCI) format that includes first information for scheduling an enhanced ultra-reliable low-latency communication (URLLC) service on a physical uplink shared channel (PUSCH). The first information of the UL DCI format may include at least one of the following: antenna port information, a transmission configuration indication, a sounding reference signals (SRS) request, a carrier indication, a channel state information (CSI) request, a beta_offset indicator, an SRS resource indicator, a repetition factor, a priority indication, or a time domain resource assignment.

The UE 102 may monitor 1704 a downlink (DL) DCI format that includes second information for scheduling the enhanced URLLC service on a physical downlink shared channel (PDSCH). The second information DL DCI format may include at least one of the following: antenna port information, a transmission configuration indication, an SRS request, a carrier indication, a repetition factor, a priority indication, a rate matching indicator, a physical resource block (PRB) bundling size indicator, zero power (ZP) channel state information-reference signal (CSI-RS) triggering, or a time domain resource assignment.

In an approach, the UL DCI format and the DL DCI format may be new DCI formats. In another approach, the first information of the UL DCI format and the second information of the DL DCI format modify 3GPP Release-15 DCI formats. Fields in the 3GPP Release-15 DCI formats may be reinterpreted to determine the first information and the second information.

Figure 18:
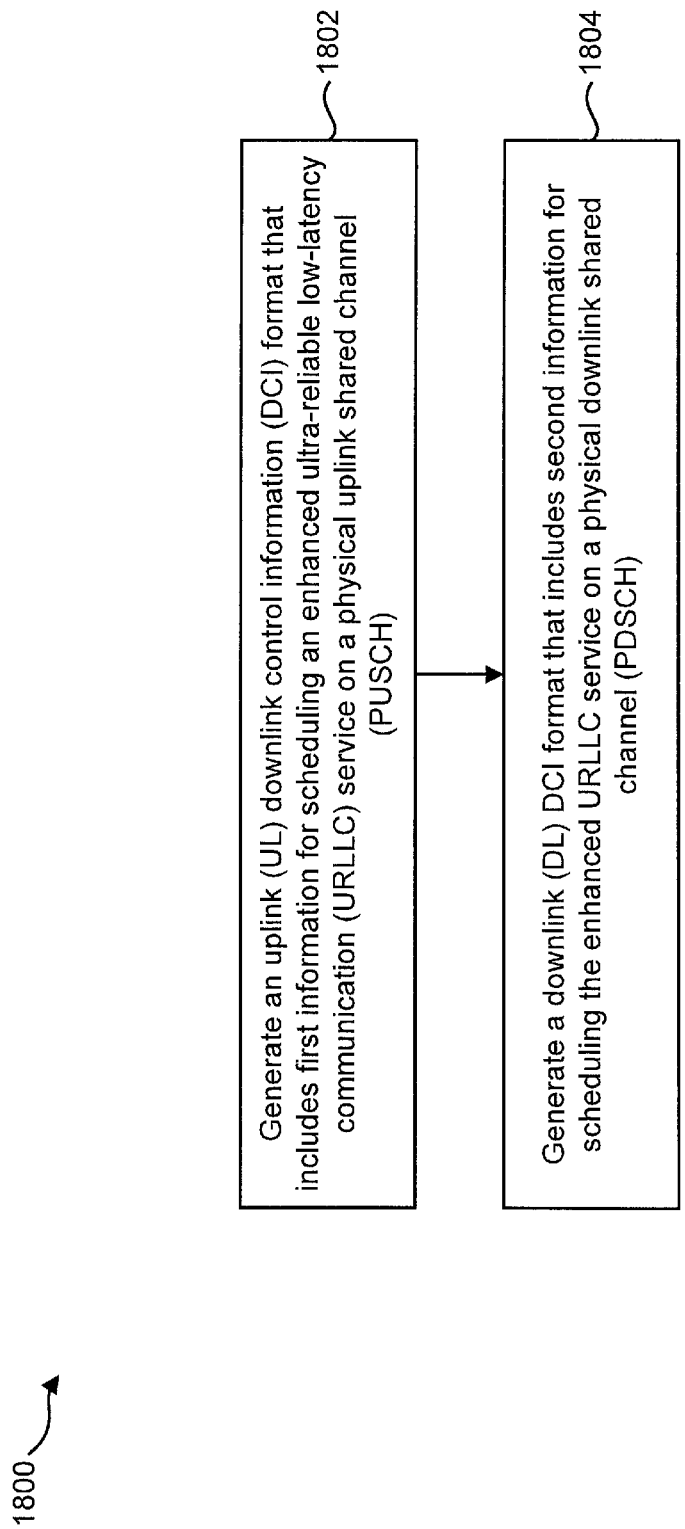
FIG. 18 is a flow diagram illustrating a method by gNB.

FIG. 18 is a flow diagram illustrating a method 1800 by a base station (gNB) 160. The gNB 160 may generate 1802 an uplink (UL) downlink control information (DCI) format that includes first information for scheduling an enhanced ultra-reliable low-latency communication (URLLC) service on a physical uplink shared channel (PUSCH). The gNB 160 may generate 1804 a downlink (DL) DCI format that includes second information for scheduling the enhanced URLLC service on a physical downlink shared channel (PDSCH).

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

<Summary>

In one example, a user equipment (UE), comprising: a higher layer processor configured to monitor an uplink (UL) downlink control information (DCI) format that includes first information for scheduling an enhanced ultra-reliable low-latency communication (URLLC) service on a physical uplink shared channel (PUSCH); and the higher layer processor configured to monitor a downlink (DL) DCI format that includes second information for scheduling the enhanced URLLC service on a physical downlink shared channel (PDSCH).

In one example, the UE, wherein the first information of the UL DCI format comprises at least one of antenna port information, a transmission configuration indication, a sounding reference signals (SRS) request, a carrier indication, a channel state information (CSI) request, a beta_offset indicator, an SRS resource indicator, a repetition factor, a priority indication, or a time domain resource assignment.

In one example, the UE, wherein the second information DL DCI format comprises at least one of antenna port information, a transmission configuration indication, an SRS request, a carrier indication, a repetition factor, a priority indication, a rate matching indicator, a physical resource block (PRB) bundling size indicator, zero power (ZP) channel state information-reference signal (CSI-RS) triggering, or a time domain resource assignment.

In one example, the UE, wherein the UL DCI format and DL DCI format are new DCI formats.

In one example, the UE, wherein the first information of the UL DCI format and the second information of the DL DCI format modify 3GPP Release-15 DCI formats.

In one example, the UE, wherein fields in the 3GPP Release-15 DCI formats are reinterpreted to determine the first information and the second information.

In one example, a base station (gNB), comprising: a higher layer processor configured to generate an uplink (UL) downlink control information (DCI) format that includes first information for scheduling an enhanced ultra-reliable low-latency communication (URLLC) service on a physical uplink shared channel (PUSCH); and the higher layer processor configured to generate a downlink (DL) DCI format that includes second information for scheduling the enhanced URLLC service on a physical downlink shared channel (PDSCH).

In one example, the gNB, wherein the first information of the UL DCI format comprises at least one of antenna port information, a transmission configuration indication, a sounding reference signals (SRS) request, a carrier indication, a channel state information (CSI) request, a beta_offset indicator, an SRS resource indicator, a repetition factor, a priority indication, or a time domain resource assignment.

In one example, the gNB, wherein the second information DL DCI format comprises at least one of antenna port information, a transmission configuration indication, an SRS request, a carrier indication, a repetition factor, a priority indication, a rate matching indicator, a physical resource block (PRB) bundling size indicator, zero power (ZP) channel state information-reference signal (CSI-RS) triggering, or a time domain resource assignment.

In one example, the gNB, wherein the first information of the UL DCI format and the second information of the DL DCI format are new DCI formats.

In one example, the gNB, wherein the first information of the UL DCI format and the second information of the DL DCI format modify 3GPP Release-15 DCI formats.

In one example, the gNB, wherein fields in the 3GPP Release-15 DCI formats are reinterpreted to determine the first information and the second information.

In one example, a method by a user equipment (UE), comprising: monitoring an uplink (UL) downlink control information (DCI) format that includes first information for scheduling an enhanced ultra-reliable low-latency communication (URLLC) service on a physical uplink shared channel (PUSCH); and monitoring a downlink (DL) DCI format that includes second information for scheduling the enhanced URLLC service on a physical downlink shared channel (PDSCH).

In one example, a method by a base station (gNB), comprising: generating an uplink (UL) downlink control information (DCI) format that includes first information for scheduling an enhanced ultra-reliable low-latency communication (URLLC) service on a physical uplink shared channel (PUSCH); and generating a downlink (DL) DCI format that includes second information for scheduling the enhanced URLLC service on a physical downlink shared channel (PDSCH).

In one example, A user equipment (UE) comprising: receiving circuitry configured to receive a radio resource control (RRC) message comprising first information used for a first physical uplink shared channel (PUSCH) transmission scheduled by a first downlink control information (DCI) format, the first information comprising a first parameter for defining antenna ports, a second parameter for defining carrier(s), a third parameter for defining priority, and a first allocation table used for defining a time domain allocation, the receiving circuitry configured to receive a RRC message comprising second information used for a second PUSCH transmission scheduled by a second DCI format, the second information comprising a fourth parameter for defining antenna ports, a fifth parameter for defining carrier(s), a sixth parameter for defining priority, and a second allocation table used for defining a time domain allocation, transmitting circuitry configured to perform, based on a detection of the first DCI format, the first PUSCH transmission according to the first information, the transmitting circuitry configured to perform, based on a detection of the second DCI format, the second PUSCH transmission according to the second information, wherein the first DCI format and the second DCI format are monitored in different search spaces.

In one example, a base station apparatus comprising: transmitting circuitry configured to transmit a radio resource control (RRC) message comprising first information used for a first physical uplink shared channel (PUSCH) transmission scheduled by a first downlink control information (DCI) format, the first information comprising a first parameter for defining antenna ports, a second parameter for defining carrier(s), a third parameter for defining priority, and a first allocation table used for defining a time domain allocation, the transmitting circuitry configured to transmit a RRC message comprising second information used for a second PUSCH transmission scheduled by a second DCI format, the second information comprising a fourth parameter for defining antenna ports, a fifth parameter for defining carrier(s), a sixth parameter for defining priority, and a second allocation table used for defining a time domain allocation, receiving circuitry configured to receive, based on a transmission of the first DCI format, the first PUSCH transmission according to the first information, the receiving circuitry configured to receive, based on a transmission of the second DCI format, the second PUSCH transmission according to the second information, wherein the first DCI format and the second DCI format are monitored in different search spaces.

In one example, a communication method of a user equipment (UE) comprising: receiving a radio resource control (RRC) message comprising first information used for a first physical uplink shared channel (PUSCH) transmission scheduled by a first downlink control information (DCI) format, the first information comprising a first parameter for defining antenna ports, a second parameter for defining carrier(s), a third parameter for defining priority, and a first allocation table used for defining a time domain allocation, receiving a RRC message comprising second information used for a second PUSCH transmission scheduled by a second DCI format, the second information comprising a fourth parameter for defining antenna ports, a fifth parameter for defining carrier(s), a sixth parameter for defining priority, and a second allocation table used for defining a time domain allocation, transmitting, based on a detection of the first DCI format, the first PUSCH transmission according to the first information, transmitting, based on a detection of the second DCI format, the second PUSCH transmission according to the second information, wherein the first DCI format and the second DCI format are monitored in different search spaces.

In one example, a communication method of a base station apparatus comprising: transmitting a radio resource control (RRC) message comprising first information used for a first physical uplink shared channel (PUSCH) transmission scheduled by a first downlink control information (DCI) format, the first information comprising a first parameter for defining antenna ports, a second parameter for defining carrier(s), a third parameter for defining priority, and a first allocation table used for defining a time domain allocation, transmitting a RRC message comprising second information used for a second PUSCH transmission scheduled by a second DCI format, the second information comprising a fourth parameter for defining antenna ports, a fifth parameter for defining carrier(s), a sixth parameter for defining priority, and a second allocation table used for defining a time domain allocation, receiving, based on a transmission of the first DCI format, the first PUSCH transmission according to the first information, receiving, based on a transmission of the second DCI format, the second PUSCH transmission according to the second information, wherein the first DCI format and the second DCI format are monitored in different search spaces.

CROSS REFERENCE

This Nonprovisional application claims priority under 35 U.S.C. § 119 on provisional Application No. 62/825,538 on Mar. 28, 2019, the entire contents of which are hereby incorporated by reference.

What is claimed is:

1. A user equipment (UE) comprising:
receiving circuitry configured to receive a radio resource control (RRC) configuration comprising a first parameter used for defining a bit field size of an antenna ports field in a first downlink control information (DCI) format, a second parameter used for defining a bit field size of a carrier indicator field in the first DCI format, and a third parameter indicating a first allocation table used for defining a bit field size of a time domain allocation resource assignment in the first DCI format, wherein the first DCI format includes a 4-bit HARQ process number field; and
transmitting circuitry configured to perform, based on a detection of the first DCI format, a first physical uplink shared channel (PUSCH) transmission, wherein
in a case where the first PUSCH transmission is scheduled by the first DCI format, the first PUSCH transmission is performed according to the first parameter, the second parameter, and the third parameter, and
in a case where the first PUSCH transmission is a PUSCH transmission for which a plurality of configurations is configured, the first PUSCH transmission is performed according to one of the plurality of configurations, wherein the 4-bit HARQ process number field indicates that the one of the plurality of configurations is activated-a first physical uplink shared channel (PUSCH) transmission, wherein a configuration identifier of the first PUSCH transmission is indicated by the HARQ process number field, wherein
the receiving circuitry is further configured to receive an RRC configuration comprising a fourth parameter used for defining a bit field size of an antenna ports field in a second DCI format, a fifth parameter used for defining a bit field size of a carrier indicator field in the second DCI format, a sixth parameter used for defining a bit field size of a priority indicator field in the second DCI format, and a seventh parameter indicating a second allocation table used for defining a bit field size of a time domain allocation resource assignment in the second DCI format, and
the transmitting circuitry is further configured to perform, based on a detection of the second DCI format according to the fourth information, the fifth information, the sixth information and the seventh information, a second PUSCH transmission.

2. The UE of claim 1, wherein the receiving circuitry is further configured to monitor the first DCI format and the second DCI format in different search spaces.

3. A method performed by a user equipment (UE), the method comprising:
receiving a radio resource control (RRC) configuration comprising a first parameter used for defining a bit field size of an antenna ports field in a first downlink control information (DCI) format, a second parameter used for defining a bit field size of a carrier indicator field in the first DCI format, and a third parameter indicating a first allocation table used for defining a bit field size of a time domain allocation resource assignment in the first DCI format, wherein the first DCI format includes a 4-bit HARQ process number field;
performing, based on a detection of the first DCI format, a first physical uplink shared channel (PUSCH) transmission, wherein
in a case where the first PUSCH transmission is scheduled by the first DCI format, the first PUSCH transmission is performed according to the first parameter, the second parameter, and the third parameter, and
in a case where the first PUSCH transmission is a PUSCH transmission for which a plurality of configurations is configured, the first PUSCH transmission is performed according to one of the plurality of configurations, wherein the 4-bit HARQ process number field indicates that the one of the plurality of configurations is activated;

receiving an RRC configuration comprising a fourth parameter used for defining a bit field size of an antenna ports field in a second DCI format, a fifth parameter used for defining a bit field size of a carrier indicator field in the second DCI format, a sixth parameter used for defining a bit field size of a priority indicator field in the second DCI format, and a seventh parameter indicating a second allocation table used for defining a bit field size of a time domain allocation resource assignment in the second DCI format; and performing, based on a detection of the second DCI format according to the fourth information, the fifth information, the sixth information and the seventh information, a second PUSCH transmission.

4. A base station comprising:

transmitting circuitry configured to transmit a radio resource control (RRC) configuration comprising a first parameter used for defining a bit field size of an antenna ports field in a first downlink control information (DCI) format, a second parameter used for defining a bit field size of a carrier indicator field in the first DCI format, and a third parameter indicating a first allocation table used for defining a bit field size of a time domain allocation resource assignment in the first DCI format, wherein the first DCI format includes a 4-bit HARQ process number field; and receiving circuitry configured to receive a first physical uplink shared channel (PUSCH) transmission, wherein in a case where the first PUSCH transmission is scheduled by the first DCI format, the first PUSCH transmission is received according to the first parameter, the second parameter, and the third parameter, and in a case where the first PUSCH transmission is a PUSCH transmission for which a plurality of configurations is configured, the first PUSCH transmission is received according to one of the plurality of configurations, wherein the 4-bit HARQ process number field indicates that the one of the plurality of configurations is activated, wherein the transmitting circuitry is further configured to transmit an RRC configuration comprising a fourth parameter used for defining a bit field size of an antenna ports field in a second DCI format, a fifth parameter used for defining a bit field size of a carrier indicator field in the second DCI format, a sixth parameter used for defining a bit field size of a priority indicator field in the second DCI format, and a seventh parameter indicating a second allocation table used for defining a bit field size of a time domain allocation resource assignment in the second DCI format, and the receiving circuitry is further configured to receive a second PUSCH transmission scheduled by the second DCI format according to the fourth information, the fifth information, the sixth information and the seventh information.

5. The base station of claim 4, wherein the transmitting circuitry is further configured to transmit the first DCI format and the second DCI format in different search spaces.

* * * * *